(12) United States Patent
Learned et al.

(10) Patent No.: US 10,159,004 B2
(45) Date of Patent: Dec. 18, 2018

(54) MESSAGE FRACTIONATION AND PHYSICAL LAYER CHANNEL ASSIGNMENT FOR MULTIUSER DETECTION-ENABLED WIRELESS COMMUNICATION AMONG ADAPTIVE INTERFERENCE

(71) Applicant: Massachusetts Institute of Technology, Cambridge, MA (US)

(72) Inventors: Rachel E. Learned, Waltham, MA (US); Prabahan Basu, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 60 days.

(21) Appl. No.: 15/522,844

(22) PCT Filed: Nov. 2, 2015

(86) PCT No.: PCT/US2015/058586
§ 371 (c)(1),
(2) Date: Apr. 28, 2017

(87) PCT Pub. No.: WO2016/114844
PCT Pub. Date: Jul. 21, 2016

(65) Prior Publication Data
US 2018/0279137 A1 Sep. 27, 2018

Related U.S. Application Data

(60) Provisional application No. 62/074,291, filed on Nov. 3, 2014.

(51) Int. Cl.
*H04W 16/04* (2009.01)
*H04W 24/02* (2009.01)
(Continued)

(52) U.S. Cl.
CPC .......... *H04W 24/02* (2013.01); *H04W 16/04* (2013.01); *H04W 16/14* (2013.01);
(Continued)

(58) Field of Classification Search
None
See application file for complete search history.

(56) References Cited

U.S. PATENT DOCUMENTS 6,487,414 B1 11/2002 Tanay et al.
6,704,376 B2 3/2004 Mills et al.
(Continued)

FOREIGN PATENT DOCUMENTS

WO  WO 2010/066289 A1  6/2010
WO  WO 2011/006116 A1  1/2011
WO  WO 2011/055319 A1  5/2011

OTHER PUBLICATIONS

Office Action dated Nov. 15, 2017 from U.S. Appl. No. 15/618,848; 18 Pages.
(Continued)

*Primary Examiner* — Ajit Patel
(74) *Attorney, Agent, or Firm* — Daly, Crowley, Mofford & Durkee, LLP

(57) ABSTRACT

A cognitive coexistence radio utilizes message fractionation and physical layer channel assignment to achieve co-existence communications in the presence of interferers. A transmit signal is split into a plurality of streams for transmission in occupied channels according to power allocation and modulation scheme. A near-optimal selfish power allocation scheme is based on the water-filling solution. A receiver can receive and decode the streams using parallel MUDs.

12 Claims, 8 Drawing Sheets

(51) Int. Cl.
*H04W 16/14* (2009.01)
*H04W 72/08* (2009.01)
*H04W 52/34* (2009.01)

(52) U.S. Cl.
CPC ........ *H04W 72/082* (2013.01); *H04W 52/346* (2013.01); *Y02D 70/00* (2018.01); *Y02D 70/1262* (2018.01); *Y02D 70/1264* (2018.01); *Y02D 70/142* (2018.01); *Y02D 70/146* (2018.01)

(56) References Cited

U.S. PATENT DOCUMENTS

| | | | |
|---|---|---|---|
| 6,947,505 | B2 | 9/2005 | Learned |
| 7,031,266 | B1 | 4/2006 | Patel et al. |
| 7,058,422 | B2 | 6/2006 | Learned et al. |
| 7,085,575 | B2 | 8/2006 | Fabien et al. |
| 7,092,452 | B2 | 8/2006 | Taylor et al. |
| 7,126,890 | B2 | 10/2006 | Learned et al. |
| 7,190,743 | B2 | 3/2007 | Learned |
| 7,218,690 | B2 | 5/2007 | Learned |
| 7,269,223 | B2 | 9/2007 | Learned et al. |
| 7,558,238 | B1 | 7/2009 | Sun et al. |
| 7,593,473 | B2 | 9/2009 | Learned et al. |
| 7,593,492 | B1 | 9/2009 | Lande |
| 7,724,851 | B2 | 5/2010 | Learned et al. |
| 7,738,906 | B2 | 6/2010 | Attar et al. |
| 8,218,450 | B2* | 7/2012 | Aoyama ............... H04W 16/22 370/252 |
| 9,148,804 | B2 | 9/2015 | Learned |
| 2001/0028675 | A1 | 10/2001 | Bierly et al. |
| 2002/0002052 | A1 | 1/2002 | McHenry |
| 2002/0122413 | A1 | 9/2002 | Shoemake |
| 2003/0139196 | A1* | 7/2003 | Medvedev ........... H04B 7/0443 455/522 |
| 2004/0018843 | A1 | 1/2004 | Cerwall et al. |
| 2004/0082363 | A1 | 4/2004 | Hosein |
| 2004/0235472 | A1 | 11/2004 | Fujishima et al. |
| 2005/0124347 | A1 | 6/2005 | Hosein |
| 2005/0201280 | A1 | 9/2005 | Lundby et al. |
| 2006/0193294 | A1* | 8/2006 | Jorswieck ............. H04L 1/0001 370/334 |
| 2007/0086379 | A1 | 4/2007 | Takayanagi et al. |
| 2008/0089279 | A1 | 4/2008 | Hu et al. |
| 2008/0198828 | A1 | 8/2008 | Reznik et al. |
| 2008/0293353 | A1 | 11/2008 | Mody et al. |
| 2009/0154534 | A1 | 6/2009 | Hassan |
| 2009/0190566 | A1 | 7/2009 | Kwon et al. |
| 2009/0258597 | A1 | 10/2009 | Chen et al. |
| 2010/0124930 | A1 | 5/2010 | Andrews et al. |
| 2010/0142465 | A1 | 6/2010 | Medepalli et al. |
| 2010/0165956 | A1 | 7/2010 | Razzell |
| 2010/0289688 | A1 | 11/2010 | Sherman et al. |
| 2010/0304770 | A1 | 12/2010 | Wietfeldt et al. |
| 2011/0002411 | A1* | 1/2011 | Forenza ................. H04B 7/024 375/267 |
| 2011/0021153 | A1 | 1/2011 | Safavi |
| 2011/0093540 | A1 | 4/2011 | Eisenberg et al. |
| 2011/0176508 | A1 | 7/2011 | Altintas et al. |
| 2011/0205929 | A1* | 8/2011 | Quek .................... H04W 16/30 370/252 |
| 2011/0286351 | A1 | 11/2011 | Reudink |
| 2012/0039183 | A1 | 2/2012 | Barbieri et al. |
| 2012/0069941 | A1 | 3/2012 | Herbig |
| 2012/0071102 | A1 | 3/2012 | Palomar et al. |
| 2012/0108276 | A1 | 5/2012 | Lang et al. |
| 2012/0208571 | A1 | 8/2012 | Park et al. |
| 2013/0035108 | A1 | 2/2013 | Joslyn et al. |
| 2013/0244681 | A1 | 9/2013 | Ookubo et al. |
| 2014/0293867 | A1 | 10/2014 | Horiuchi et al. |
| 2014/0314003 | A1 | 10/2014 | Zhou et al. |
| 2014/0348004 | A1 | 11/2014 | Ponnuswamy |
| 2015/0049721 | A1 | 2/2015 | Wijting et al. |
| 2015/0282176 | A1 | 10/2015 | MacLeod et al. |
| 2015/0282189 | A1 | 10/2015 | Learned et al. |
| 2015/0311971 | A1 | 10/2015 | Learned et al. |
| 2015/0365956 | A1 | 12/2015 | Learned |

OTHER PUBLICATIONS

Final Office Action dated Sep. 12, 2017 from U.S. Appl. No. 14/648,049; 43 Pages.
U.S. Appl. No. 15/618,848, filed Jun. 9, 2017, Learned, et al.
Response to Office Action dated Apr. 14, 2017 as filed on Jul. 14, 2017 from U.S. Appl. No. 14/648,049; 17 Pages.
Non-Final Office Action dated Jul. 18, 2018 for U.S. Appl. No. 15/317,750; 32 pages.
Notice of Allowance dated Apr. 4, 2017 from U.S. Appl. No. 14/437,882; 11 Pages.
PCT International Preliminary Report on Patentability of the ISA dated May 18, 2017 from International App. No. PCT/US2015/058586; 6 Pages.
Notice of Allowance dated Mar. 27, 2018 for U.S. Appl. No. 14/648,049; 9 Pages.
Request for Continued Examination (RCE) and Response to Final Office Action dated Sep. 12, 2017 for U.S. Appl. No. 16/648,049; RCE and Response filed on Feb. 12, 2018; Pages.
Preliminary Amendment filed May 4, 2018 for U.S. Appl. No. 15/618,848; 14 Pages.
U.S. Final Office Action dated May 7, 2018 for U.S. Appl. No. 15/618,848; 11 Pages.
U.S. Appl. No. 15/317,750, filed Dec. 9, 2016, Learned.
Ahmed, et al.; "Entropy Expressions and Their Estimators for Multivariate Distributions;" IEEE Transactions on Information Theory; vol. 35; No. 3; May 1989; 5 Pages.
Bahl, et al.; "Optimal Decoding of Linear Codes for Minimizing Symbol Error Rate;" IEEE Transactions on Information Theory; Mar. 1974; 4 Pages.
Learned; "Making Optimal Use of the Asymmetric Inference Channel;" IEEE; Signals, Systems and Computers (Asilomar); Nov. 6-9, 2011; 6 Pages.
Learned; "Making Optimal Use of the Asymmetric Interference Channel;" Asilomar Conference on Signals, Systems, and Computing; Presentation; Nov. 8, 2011; 63 Pages.
Neeser, et al.; "Proper Complex Random Processes with Applications to Information Theory;" IEEE Transactions on Information Theory; vol. 39; No. 4; Jul. 1993; 10 Pages.
Pham; "Fast Algorithms for Mutual Information Based Independent Component Analysis;" IEEE Transactions on Signal Processing; vol. 52; No. 10; Oct. 2004; 11 Pages.
Tufts; "Design Problems in Pulse Transmission;" Technical Report 368; Massachusetts Institute of Technology; Jul. 28, 1960; 52 Pages.
Tufts; "Nyquist's Problem—The Joint Optimization of Transmitter and Receiver in Pulse Amplitude Modulation;" Proceedings of the IEEE: vol. 53; Issue 3; Nov. 20, 1964;13 Pages.
Ungerboeck; "Channel Coding with Multilevel/Phase Signals;" IEEE Transactions on Information Theory; vol. IT-28; No. 1; Jan. 1981; 13 Pages.
Verdu; "The Capacity Region of the Symbol-Asynchronous Gaussian Multiple-Access Chanel;" IEEE Transactions on Information Theory; vol. 35; No. 4; Jul. 1989; 19 Pages.
PCT International Search Report and Written Opinion for International App. No. PCT/US13/47026 dated Oct. 2, 2013; 16 Pages.
PCT International Search Report and Written Opinion for International App. No. PCT/US13/68710 dated Jan. 7, 2014; 15 Pages.
PCT International Search Report and Written Opinion for International App. No. PCT/US2013/031900 dated Jan. 15, 2014; 12 Pages.
Office Action dated Feb. 4, 2015 for U.S. Appl. No. 13/998,566; 9 Pages.
Response to Office Action dated Feb. 4, 2015 corresponding to U.S. Appl. No. 13/998,566; Response filed on May 4, 2015; 8 Pages.
PCT International Preliminary Report on Patentability of the ISA for Appl. No. PCT/US2013/031900 dated May 21, 2015; 9 Pages.
PCT International Preliminary Report on Patentability of the ISA for Appl. No. PCT/US2013/068710 dated May 21, 2015; 9 Pages.

(56) References Cited

OTHER PUBLICATIONS

Notice of Allowance dated Jun. 8, 2015 for U.S. Appl. No. 13/998,566; 17 Pages.
PCT International Preliminary Report on Patentability of the ISA dated Sep. 24, 2015 for Appl. No. PCT/US2013/047026; 11 Pages.
PCT International Search Report and Written Opinion dated Feb. 26, 2016 for International App. No. PCT/US15/35963; 11 Pages.
PCT International Search Report and Written Opinion dated Jul. 15, 2016 for International App. No. PCT/US15/58586; 12 Pages.
U.S. Restriction Requirement dated Aug. 16, 2016 corresponding to U.S. Appl. No. 14/437,350; 7 Pages.
Office Action dated Sep. 9, 2016 from U.S. Appl. No. 14/585,780; 27 Pages.
Response to U.S. Restriction Requirement dated Aug. 16, 2016 corresponding to U.S. Appl. No. 14/437,350, filed Sep. 12, 2016; 1 Page.
Office Action Dated Sep. 29, 2016 from U.S. Appl. No. 14/437,350; 19 Pages.
Office Action dated Oct. 12, 2016 from U.S. Appl. No. 14/648,049; 43 Pages.
U.S. Restriction Requirement dated Nov. 9, 2016 corresponding to U.S. Appl. No. 14/437,882; 7 Pages.
Response to U.S. Restriction Requirement dated Nov. 9, 2016 corresponding to U.S. Appl. No. 14/437,882, filed Nov. 29, 2016; 1 Page.
Response to Office Action dated Sep. 9, 2016 from U.S. Appl. No. 14/585,780, filed Dec. 7, 2016; 6 Pages.
Response to Office Action Dated Sep. 29, 2016 from U.S. Appl. No. 14/437,350, filed Dec. 19, 2016; 8 Pages.
PCT International Preliminary Report on Patentability of the ISA dated Dec. 29, 2016 from International App. No. PCT/US2015/035963; 7 Pages.
Office Action Dated Jan. 5, 2017 from U.S. Appl. No. 14/437,882; 24 Pages.
Response to Office Action Dated Jan. 5, 2017 from U.S. Appl. No. 14/437,882, filed Jan. 31, 2017; 13 Pages.
Response to Office Action dated Oct. 12, 2016 from U.S. Appl. No. 14/648,049, filed Jan. 31, 2017; 13 Pages.
Office Action Dated Mar. 14, 2017 from U.S. Appl. No. 14/648,049; 35 Pages.
Notice of Allowance dated Mar. 17, 2017 for U.S. Appl. No. 14/437,350; 10 Pages.
Notice of Allowance dated Mar. 22, 2017 for U.S. Appl. No. 14/585,780; 14 Pages.
Notice of Allowance dated Aug. 2, 2018 for U.S. Appl. No. 15/618,848; 9 Pages.
Response to Final Office Action dated May 7, 2018 for U.S. Appl. No. 15/618,848, filed Jul. 23, 2018; 8 Pages.

* cited by examiner

MESSAGE FRACTIONATION AND PHYSICAL LAYER CHANNEL ASSIGNMENT FOR MULTIUSER DETECTION-ENABLED WIRELESS COMMUNICATION AMONG ADAPTIVE INTERFERENCE

CROSS REFERENCE TO RELATED APPLICATIONS

This application is a U.S. National Stage of PCT application PCT/US2015/058586 filed in the English language on Nov. 2, 2015, and entitled "MESSAGE FRACTIONATION AND PHYSICAL LAYER CHANNEL ASSIGNMENT FOR MULTIUSER DETECTION-ENABLED WIRELESS COMMUNICATION AMONG ADAPTIVE INTERFERENCE," which claims the benefit under 35 U.S.C. § 119 of provisional application No. 62/074,291 filed Nov. 3, 2014, which application is hereby incorporated by reference herein in its entirety.

STATEMENT REGARDING FEDERALLY SPONSORED RESEARCH

This invention was made with Government support under Contract No. FA8721-05-C-0002 awarded by the U.S. Air Force. The Government has certain rights in the invention.

BACKGROUND

As is known in the art, different wireless networks and/or systems of radios avoid interfering with each other by various options. For example, some systems rely on pre-arrangement or careful assignment of frequency bands, time slots, or signature pulses as is done for cellular systems through frequency reuse maps and time-division multiple access (TDMA) for Global System for Mobile Communications (GSM), orthogonal frequency-division multiple access (OFDMA) for Long-Term Evolution (LTE), spread spectrum for Interim Standard 95 (IS-95), and combinations of these for wideband code-division multiple access (WCDMA) through High-Speed Packet Access (HSPA) commercial cellular standards. Other systems utilize collision avoidance techniques such as those employed for a packet based systems such as 802.11/16/22 (WiFi and WiMax) where collisions are controlled as part of a multiple access medium access control procedure, e.g. carrier sense multiple access (CSMA). Still other systems utilize on the fly interference assessment and avoidance is used in the new, currently operational paradigm for "cognitive radio" via dynamic spectrum access (DSA) for the newly allowed "secondary" user (see IEEE SCC41: Standards for Dynamic Spectrum Access Networks). This is done by the system of "secondary user" radios actively sensing the radio spectrum and coordinating to choose an empty band for transmission. Such systems typically fail if they are unable to avoid interference.

As the consumer market continues to rise for smart phones and wireless data service, the demand for more and more throughput increases drastically and the radio spectrum continues to become more crowded. A new paradigm in wireless communication is emerging where radios can be built to withstand interference to the level where interference is no longer avoided. Interference is allowed, even invited, to allow for more wireless devices to make use of the scarce free space in the wireless spectrum. For example, the LTE Advanced standard (to support the Heterogeneous Network or HetNet feature) allows, even encourages, interference. If this new feature were enabled, reliable performance would require mobiles to have some kind of interference mitigation in the receivers.

A common idea for cognitive networks is to have them adapt at a network/routing layer, not the physical layer. A typically network may learn which nodes are having trouble sending and/or receiving packets and then adjust how packets are routed to avoid the troubled nodes. Here, the goal is not to invite or encourage interference, but rather on avoid using links that are hindered by interference.

SUMMARY

Described herein are systems and methods that seek out opportunities to create interference, but do so in an intelligent way that takes advantage of the situation and device protocols and capabilities at hand, making use of advanced processing and sensing technology so as to enable high throughputs for its own link as well as the link with which it simultaneously shares the band.

The instant disclosure considers the problem of over/underlay communications in the presence of an already established network of rate adaptive nodes. Existing interference channel models are insufficient for describing such a scenario, especially when explicit coordination between the interfering networks is prohibited. Described herein are concepts and techniques for coexistence when nodes on a "second user" network are capable of performing on-the-fly optimizations (cognition) and are equipped with receivers enabling multiuser detection (MUD).

The concepts, systems, techniques described herein support next generation multiuser detection (MUD)-enabled receivers used to overcome the problem of spectrum shortage in wireless communication systems such as LTE (cell phones) and 802.11 (WiFi). Existing MUD receivers that use successive interference cancellation (SIC) are known. A SIC MUD provides interference mitigation only in special cases where the interference power is very high while the rate of the interfering signal is relatively low. Moving toward a "smart" MUD would allow for full interference leveraging. Other well known MUD techniques such as the MMSE MUD, MMSE-SIC MUD, turbo-MUD, BCJR-MUD and low complexity variants offer options capable of providing interference mitigation for all power scenarios, and even for more than two interfering signals. These more advanced MUDs cannot be fully advantaged because in the field, radios experience many possible interference conditions that are constantly changing. These MUDs, combined with MUD-enabled message fractionation, rate determination, and channel assignment will be required to realize the coordination-free operation in environments containing adaptive interfering wireless communication systems.

Described herein is a technique and implementation for how a radio should distribute its available power to maximize the throughput possible for a link set up in the presence of more than one channel with an interfering signal. The technique will enable successful dividing up of a single radio's signal into multiple disjoint signals chosen to be co-placed on top of (same time and frequency slots) multiple other pre-existing links from conventional rate adapting radios.

Described herein is a concept referred to as "MUDdy water-filling" because it relies upon a new method that takes the place of the well known water-filling method. MUDdy water-filling is suitable for the case where a receiver is capable of multiuser detection and interfering radios adapt to interference created by the MUD-enabled co-channel link.

In accordance with one aspect of the disclosure, in a radio network having a plurality of first users on channel (FUOCs) and one or more second users on channel (SUOCs), a method comprises: (a) identifying a plurality of target FUOCs, each of the target FUOCs operating in respective target FUOC channel; (b) for each target FUOC channel, determining a corresponding FUOC signal power and a corresponding noise power as seen by a SUOC receive node; (c) for each target FUOC channel, determining a corresponding FUOC signal power and a corresponding noise power as seen by a FUOC receive node; (d) allocating a total available SUOC power across two or more of the target FUOC channels as assigned FUOC channels based upon the FUOC signal powers and noise powers determined at steps (b) and (c); (e) splitting a SUOC transmit signal into a plurality of streams, each stream associated with one assigned FUOC channels; and (f) transmitting each stream within the associated assigned FUOC channel using the fraction of the total available SUOC power allocated to the assigned FUOC channel.

In some embodiments, steps (a)-(c) are performed at first SUOC node and steps (d)-(f) are performed at a second SUOC node and the method further comprises transmitting FUOC signal powers and noise powers from the first SUOC node to the second SUOC node.

In certain embodiments, determining a corresponding FUOC signal power and a noise power as seen by a SUOC receive node comprises at least one of: broadcasting from a first SUOC node, received powers in each FUOC channel to at least a second SUOC node; estimating the received power at a SUOC node for each band; and transmitting a pulse tone from a first SUOC node to a second SUOC node and measuring the response.

In various embodiments, determining a corresponding FUOC signal power and a noise power as seen by a FUOC receive node comprises estimating the corresponding FUOC signal power and noise power using information about the FUOC operates.

In some embodiments, allocating a total available SUOC power across two or more of the target FUOC channels as assigned SUOC channels comprises processing that solves a system of equations specifically formulated to take into account the factors that influence the performance of the SUOC MUD receiver and the FUOC link adaptations that are expected to occur as a result of SUOC energy being emitted in the FUOC channels.

In some embodiments, allocating a total available SUOC power across two or more of the target FUOC channels as assigned FUOC channels comprises using a water-filling technique. Using a water-filling technique may include: determining an initial equivalent noise power (ENP) for each target FUOC channel; iteratively allocating an increment of the total available SUOC power to ones of the target FUOC channels, wherein at each iteration power is allocated to a FUOC channel having a lowest minimum equivalent noise power (MENP) at each increment; and determining if one of the target FUOC channels onto which power has not been allocated has a lower MENP compared to target FUOC channels onto which power has been allocated. In some embodiments, the method further comprises constructing lookup tables mapping available power to allocated power per channel. Determining an initial ENP for each target FUOC channel may comprise: computing a ratio of the corresponding FUOC signal power as seen by a FUOC receive node and the corresponding FUOC signal power as seen by a SUOC receive node; and computing a ratio of the corresponding noise power as seen by a FUOC receive node and the corresponding noise power as seen by a SUOC receive node.

In certain embodiments, transmitting each of the plurality of streams within a respective one of the plurality of FUOC channels comprises: for each of the plurality of FUOCs, determining one or more FUOC waveform signal parameters associated with the FUOC; for each of the plurality of FUOCs, choosing an interfering waveform based upon the associated FUOC waveform signal parameters; modulating each of the plurality of streams using a respective interfering waveform; and transmitting the modulated streams. Choosing an interfering waveform may include at least one of: choosing an interfering waveform that mimics an existing FUOC signal; choosing an interfering waveform well-matched to an existing FUOC signal; and choosing an interfering waveform having a shape related to an existing FUOC signal waveform by a non-dispersive transform such that the shaped waveform remains within the channel (e.g. within the frequency band and time slot) for the existing FUOC link.

In various embodiments, the method further comprises: receiving the plurality of streams at a multiuser detection (MUD) receiver; and decoding and combining the received streams to recover a SUOC transmit signal. The MUD receiver may decode a plurality of signals using parallel MUDs.

BRIEF DESCRIPTION OF THE DRAWINGS

The concepts, structures, and techniques sought to be protected herein may be more fully understood from the following detailed description of the drawings, in which:

FIGS. 1A and 1B are stacked bar graphs showing an example of power per channel received at two different nodes of FIG. 1;

Figure 1:
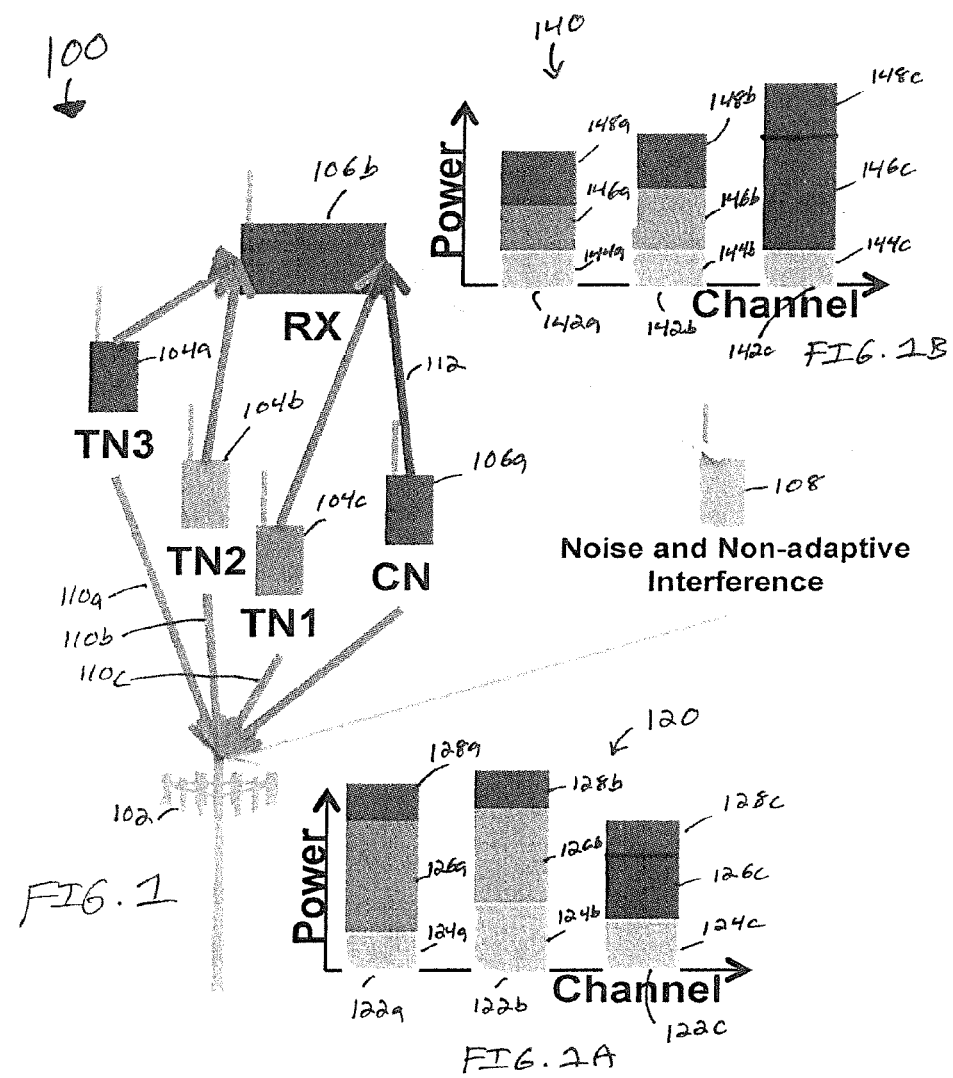
FIG. 1 is a diagram illustrating a multiuser, multichannel communications network in the presence of a second independent network.

The drawings are not necessarily to scale, or inclusive of all elements of a system, emphasis instead generally being placed upon illustrating the concepts, structures, and techniques sought to be protected herein.

DETAILED DESCRIPTION

As used herein, the phrase "cognitive radio" generally refers to an intelligent wireless communication system that is aware of its surrounding environment (i.e., outside world), senses the RF environment to which it is exposed, computes feature parameters from sensed RF signals, makes decisions based upon calculations involving the RF features along with learned features acquired from gained understanding of the environment's behavior in reaction to emissions from the said cognitive coexistence radio. Further, the cognitive coexistence radio adapts its internal states to sensed variations in the RF signals transmitted by others in the environment and makes corresponding changes in certain operating parameters (e.g., transmit-power, carrier-frequency, and modulation strategy) in real-time to have a desired effect upon the emitting devices and their corresponding links as well as a desired effect upon its own link. Often, such changes are made with two primary objectives in mind: (1) to provide highly reliable communications whenever and wherever needed; and (2) to provide efficient utilization of the radio spectrum. Networks which include such cognitive coexistence radios are referred to herein as cognitive coexistence networks.

The concepts, systems, circuit and techniques described herein find use in a wide variety of application areas including, but not limited to wireless communication such as that provided by the 4G (LTE) cellular, 802.11 (WiFi), or 802.16 (WiMax) wireless standard and equipment. Since wireless communications with MIMO (multiple input, multiple output) receivers may be similar mathematically to MUD receivers, the concepts systems and techniques described herein may be applied to radios that employ MIMO transmission/reception schemes. Further still, the concepts systems and techniques described herein may be applied to signals propagating on a cable (e.g. since receivers closer to a transmitting hub station receive a stronger signal than receivers farther away from the hub station and thus the closer receivers can "see" embedded interfering signal in the presence of the stronger signal that was actually meant for the receivers that are farther away from the transmitting hub.)

It should be appreciated that, in general, the concepts, systems and techniques described herein allow different wireless networks and/or radios to co-exist in the same frequency band (or bands) at the same time, causing interference with one another (i.e. they will interfere on purpose) without different providers and mobile nodes having to conform to a single waveform or coordination-enabling protocol. The different interfering networks/systems do not require pre-specified coordination/cooperation protocols or means of direct communication with each other to negotiate a satisfactory sharing of the same bands.

Referring to FIG. 1, an illustrative network environment 100 includes a multiuser, multichannel communications network in the presence of a second independent network. The networks include First User On Channel (FUOC) nodes 104 communicating with a base station 102 and Second User On Channel (SUOC) nodes 106 communicating using the same bands as FUOC nodes 104 using techniques to over/underlay communications. The FUOC nodes 104 may comprise conventional rate adaptive radios (or other suitable transmit-receive systems) and generally operate on distinct channels/bands. The SUOC nodes 106 comprise multiuser detection (MUD) capable cognitive radios which may be used to coexist within the FUOC channels using techniques described herein. In general, the SUOC nodes 106 do not need explicit cooperation from the FUOC nodes 104.

In the example of FIG. 1, the network environment 100 includes one FUOC network comprised of three FUOCs corresponding to nodes 104a, 104b, and 104c and a base station 102. A FUOC node 104a, 104b, 104c may communicate with the base station 102 via a respective links 110, 110b, 110c. The network environment 100 further includes one SUOC network comprised of nodes 106a and 106b, which may communicate via link 112. It should be understood that the concepts and techniques described herein apply to communication environments having generally any number of FUOC and SUOC nodes. A given communications link 110, 112 may be a unidirectional or bidirectional.

In addition to interference from SUOC nodes 106, the FUOC channels may include background noise and other interference from radios or sources of RF radiation. Such noise is assumed additive white Gaussian noise (AWGN) and is modeled by non-adaptive radios 108 in this example.

It will be appreciated that the illustrative network environment 100 provides a general model of an interference channel having a plurality of independently functioning networks, in this case, two networks, the first comprising nodes 102-104a-c, the second comprising nodes 106a-b and a radio node not in either network 108. The network environment 100 can serve as a model for several real-world scenarios, including:

Small Cell: LTE-Advanced 3G and 40 small cell heterogeneous network (HetNet) operation depends on user and service provider deployed base stations. These base stations (e.g., SUOC node 106b) are typically set up within and on top of buildings to accommodate a portion of the nearby user equipment (UE) devices (e.g., node 106a). Other not-as-nearby UEs (e.g., FUOC nodes 104) communicate with other small cell bases or link directly with the conventional macro base station towers (e.g., base station 102) some distance away.

Emergency Response: First responders in emergency situations often require high priority access to existing spectrum. Since emergencies are typically accompanied by sudden spikes in network load and since pre-coordination may be impossible, it is important for first response radios (e.g., SUOC nodes 106) to have the ability to "grab" bandwidth from conventional UEs (e.g., FUOC nodes 104) as needed.

Encompassing this problem is the more general framework of cognitive coexistence. A node from a conventional, possibly rate adaptive, network occupies a given frequency band and communicates using an open protocol. This node is referred to herein as a FUOC node. Onto this channel enters a pair of cognitive enabled nodes (referred to herein as SUOC nodes and corresponding to one or more SUOCs), each equipped with MUD and sensors capable of interference characterization, and each having the ability to dynamically adjust its transmission rates based on sensed to information as well as information relayed from the other node in the pair.

The SUOC nodes 106 may utilize any suitable MUD technique. In some embodiments, coexistence is established by a single SUOC transmitter using up to K non-overlapping FUOC channels and the corresponding SUOC receiver implementing a MUD receiver that employs a MUD algorithm that processes all K channels together or up to K MUD algorithms that process the separate channels in parallel, where each of the MUD algorithms need not be the same. A given MUD receiver can be chosen so as to achieve the highest rate bound for the case at hand. This means that, for some of the combinations of interfering signal rates and powers, an optimal MUD receiver may be required, while for other combinations of signals, relatively simpler techniques may be employed, such as demod-remod successive interference cancellation (SIC) MUD, minimum mean squared error (MMSE) MUD, or even a matched filter when MUD adds no value.

A SUOC node 106 can utilize various coexistence strategies, including a so-called "selfish" strategy or a so-called "considerate" strategy. Using a selfish strategy, a cognitive SUOC seeks to maximize its performance without regard for the effect on FUOC performance.

The operation of a multiuser, multichannel communications network is described herein with reference to FIGS. 1, 1A, and 1B. The FUOC nodes 104a, 104b, and 104c can establish respective communication links 110a, 110b, and 110c to the base station 102 on orthogonal bands. The base station 102 is equipped with a conventional matched filter receiver for each of the expected received signals. The cognitive SUOC nodes 106 attempt to establish a communication link 112 on one or more of the same bands used by FUOC links 110.

FIG. 1A is a power vs. channel stacked bar graph 120 showing power received at the base station 102 within three different channels 122a, 122b, and 122c. The channels 122a, 122b, and 122c may correspond to the channels used by FUOC links 110a, 110b, and 110c, respectively. Each stacked bar 122 includes a noise portion 124 representing a noise power in the channel (e.g., from non-adaptive radios 108), a FUOC signal portion 126 representing FUOC signal power in the channel, and a SUOC signal portion 128 representing SUOC signal power in the channel. Bar 126a corresponds to the received power at the FUOC node 102 due to the transmission from FUOC node 104c, 126b from node 104b, and 126c from node 104a. The bar 128a is the received power at the FUOC node 102 due to the portion of the SUOC node 106a transmitted signal that resides in the same channel as the FUOC transmission from node 104c. Likewise for bars 128b and c, correspond to transmissions from node 106a on the same channel as transmissions from the FUOC nodes 104b and c, respectively.

FIG. 1B is a power vs. channel stacked bar graph 140 showing power received at SUOC receiver (e.g., node 106b) within three different channels 142a, 142b, and 124c. The channels 142a, 142b, and 142c may correspond to the channels used by FUOC links 110c, 110b, and 110a, respectively. Similar to FIG. 1A, each stacked bar 142 includes a noise power portion 144, a FUOC signal power portion 146, and a SUOC signal power portion 148.

Imparted with knowledge of all relevant received signal and noise powers, the cognitive SUOC transmitter 106a can use its cognition engine to optimize and select a transmission strategy (rates and powers in each band) that either fulfills a selfish strategy objective (e.g., maximum throughput) or a considerate strategy objective. Alternatively, the SUOC receiver 106b may possess sensing and cognitive abilities while the SUOC transmitter might not. In such a case, the SUOC receiver would make the necessary decisions and convey them to the SUOC transmitter. The SUOC receiver 106b may have full set of MUD capabilities (i.e., both linear and non-linear MUD algorithms) to perform joint detection or it might have only a single type of MUD algorithm. In the example of FIGS. 1A and 1B, the SUOC link 112 is established to co-exist in the three FUOC channels (i.e., the channels used by links 110a-110c). In general, a SUOC can choose to co-exist in any suitable combination of available FUOC channels. As discussed below, by co-occupying multiple FUOC bands, a SUOC can achieve rates higher than may otherwise be possible.

Once the SOUC node 106a initiates co-existence communications (e.g., overlay or underlay communication), the FUOC nodes 104, as dictated by their adapting protocol, may adjust their rate to accommodate the increased interference introduced by the new co-channel signal. In various embodiments, the FUOC nodes adapt only the rate, not power or frequency.

Figure 2:
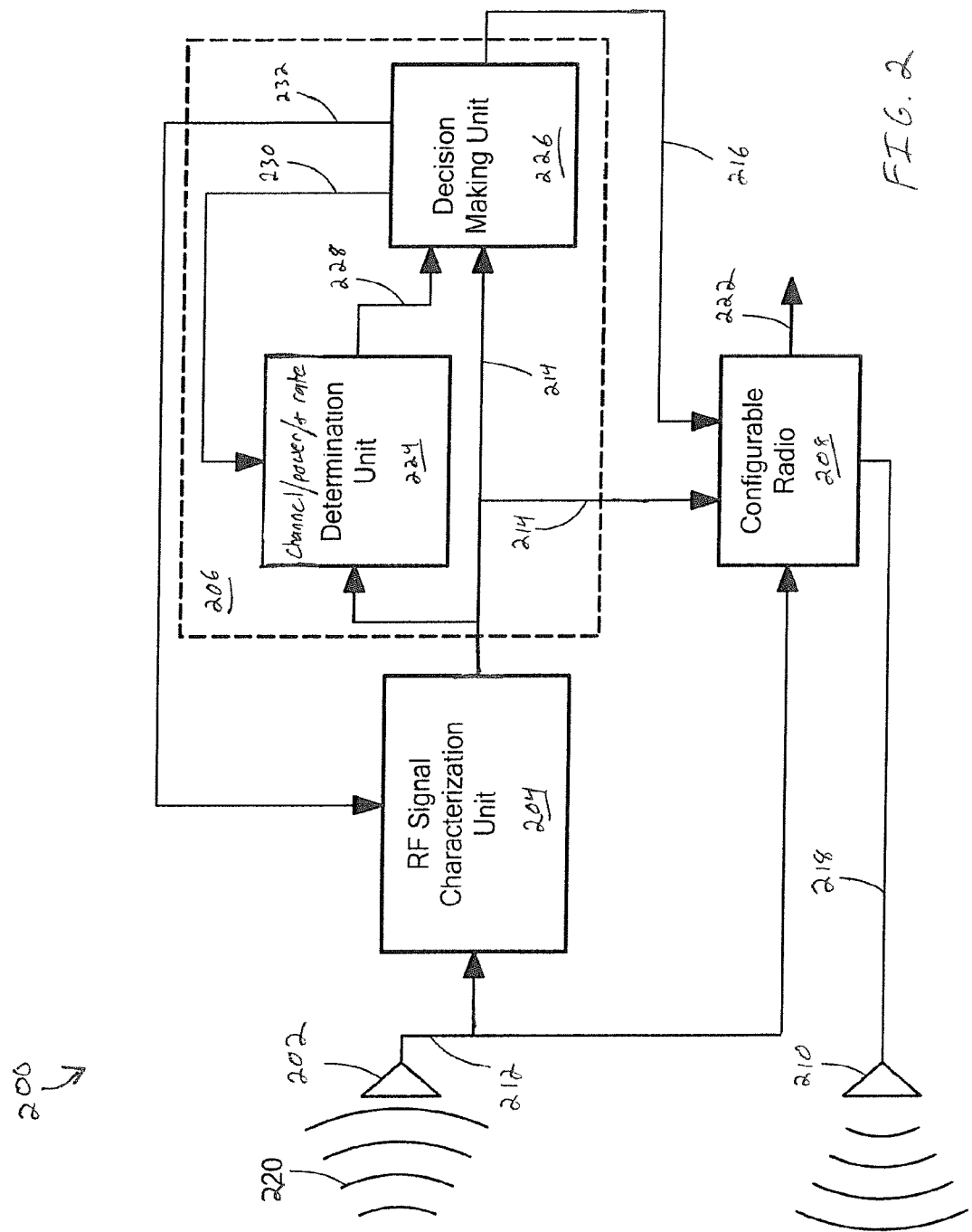
FIG. 2 is a block diagram of an illustrative cognitive transmit-receive system for use by a network of nodes that need to coexist within the presence of another independent network, as in the case of FIG. 1.

Referring to FIG. 2, a cognitive coexistence transmit-receive system 200 may be used by a SUOC node (e.g., a SUOC node 106 in FIG. 1) to achieve co-existence communications in the presence of FUOCs. The illustrative system 200 comprises a receive antenna 202, an RF signal characterization unit ("signal characterization unit 204") 204, a cognitive engine 206, a configurable radio 208, and a transmit antenna 210. In the embodiment shown, the cognitive engine 206 includes a channel/power/rate determination unit ("determination unit") 224 and a decision making unit 226. In the embodiment shown, the receive antenna 202 is operatively coupled to the signal characterization unit 204 and configurable radio 208 via signal path 212; the signal characterization unit 204 is operatively coupled to the determination unit 224, the decision making unit 226, and the configurable radio 208 via signal path 214; the decision making unit 226 is operatively coupled to the signal characterization unit 224 via signal paths 228 and 230, and to the signal characterization unit via signal path 232; and the configurable radio 208 is operatively coupled to the decision making unit 226 via signal path 216 and to the transmit antenna 210 via signal path 218. In various embodiments, the receive antenna 202 and transmit antenna 210 are provided on common physical structure.

The configurable radio 208 may include a transmitter and multiuser detection (MUD) receiver. In some cases, the radio 208 includes multiple MUD receivers to decode multiple signals in parallel. This radio 208 is capable of transmitting control signals to the transmit-SUOC as well as receiving and understanding control signals from the other SUOC radios to which it is the transmit-SUOC. For example, the radio 208 may transmit/receive rate and channel power allocation information, as determined by the cognitive engine 206. The configurable radio 208 is also capable of transmitting buffered data via wireless transmission, according to a given waveform to include the medium access control scheme and other network layer protocols appropriate for successful wireless communication among radio nodes such as what is used in the cell phone handsets and base stations or in WiFi nodes and gateways.

The signal characterization unit 204 is configured to process received radio frequency (RF) signals and to provide output data including, but not limited to parameters of the received signals. Such signal parameters may include, for example, a carrier frequency and band that corresponds to a unique FUOC transmitted signal (also referred to as a target FUOC) and one or more of the following parameters associated with each target FUOC: received signal power, received signal modulation type (e.g. QPSK), error correction coding type, code rate, received signal signature pulse shape (e.g. root raised cosine), timing offset relative to reference, received phase offset relative to reference, baud rate and/or symbol duration, channel transfer function and/ or multipath characterization of channel.

The signal characterization unit 204 is capable of sensing all or part of an RF spectrum that is potentially available for use by a SUOC. For each block of spectrum under examination of this unit, this unit measures and/or estimates each band of spectrum that is associated with a single RF system and or radio, as well as other signal parameters that are needed for operation of a cognitive coexistence radio or a system which includes or utilizes a cognitive coexistence radio or any related cognitive coexistence radio techniques.

It should also be appreciated that signal characterization unit 204 can also be used for pre-engagement of SUOC radios to acquire an estimate of the received power of the SUOC transmitters to which this receive SUOC radio will ultimately communicate. This pre-engagement SUOC characterization can alternatively be achieved using control signals transmitted/received by a configurable radio 208, as described hereinabove.

It certain embodiments, both the signal characterization unit 204 and the configurable radio 208 may include a typical radio front-end to down convert and process received RF signals. In some embodiments, both the signal characterization unit 204 and the configurable radio 208 may each use the same front-end circuitry. In some embodiments, a sliding filter may be provided as part of front-end circuitry to observe the different RF bands one at a time in the signal characterization unit 204. In some other embodiments, a wideband front-end may be used to capture signals within multiple (or all) of the RF bands at the same time.

In operation, the receive antenna 202 is disposed to intercept electromagnetic waves or signals 220 propagating in the environment about the location of the receive antenna 202. The receive antenna 202 generates a received radio frequency (RF) signal and provides the received RF signal via signal path 212 to the signal characterization unit 204. The signal characterization unit 204 receives the signals provided thereto via antenna 202 and processes the received signals to determine signal parameters. The signal parameters may be provided to the determination unit 224 and the decision making unit 226 via signal path 214.

For each target FUOC channel identified via the input on signal path 214, the determination unit 224 may determine a recommended power and rate that will allow for the MUD in the SUOC receiver to successfully pull out the SUOC signal of interest in the presence of the target FUOC's interfering signal. Such information can be provided to the decision making unit 226 via signal path 228. Alternatively, and in addition to or in place of the above, signal path 228 may carry a max rate, a min rate, and/or other rate possibilities for each target FUOC. Also, if the SUOC has more than one MUD it can use, then there would be a rate or set of rates for each MUD.

Decision making unit 226 receives signal parameters from the signal characterization unit 204 and power/rate/waveform information from the determination unit 224 and, in response thereto, provides control information to determination unit 224 via signal path 230. It should be appreciated that if any of the target FUOCs powers or rates change across the time periods in which the parameters have been consecutively estimated decision making unit 226 may request an updated list of potential target FUOCs with recommendations for SUOC rate along with any constraints decision making unit 226 puts on the SUOC's power. Also, along with this request, the new power and/or rate of the target FUOC is provided to the determination unit 224. This may be accomplished, for example, by the signal characterization unit and a trigger message provided from either determination unit 224 or decision making unit 226 to signal characterization unit 204 to tell the signal characterization unit 204 to collect and estimate the needed parameters in the target band.

Signal path 230 may also provide control information from decision making unit 226 to determination unit 224. This control information is used by determination unit 224 to trigger it to provide specific output along signal path 228 at times this new information is required by decision making unit 226 to perform the various decision making unit 226 functions that are described within this document. The control information passed from decision making unit 226 to determination unit 224 along path 230 may contain, but is not limited to the following: request for transmit-SUOC achievable rate(s) in presence of a specific target FUOC or a list of multiple target FUOCs with which to consider as simultaneous channels for coplacement of a single to SOUC's link, and values used in the determination of the SUOC's achievable rate/s such as transmit-SUOC's received signal-to-noise ratio (SNR) in each FUOC channel, MUD/s to be used in the receive SUOC for each achievable transmit-SUOC rate, target FUOC modulation, and, if applicable, target FUOC's coding rate and received power.

In various embodiments, the decision making unit 226 can detect coexistence on the FUOC channels and make necessary adjustments. For example, if the decision making unit 226 detects a particularly high impact on one of the FUOCs, it can notify the determination unit (via signal path 230) such that the corresponding SUOC transmission power and/or rate should be decreased. Specific to this invention, decision making unit may determine that coexistence of the SUOC link with any single FOUC channel results in significant degradation of each of the available FUOC channels and can send a control signal to unit 224 to request power allocations that would optimize coplacement of the SUOC link on multiple FUOC links instead of just one. It will be appreciated that the option of spreading transmit power across all or many available FUOC channels will reduce the interference experienced by any single FUOC for the case when the SUOC link places all of its power on a single FUOC channel. The decision making unit 226 may recognize a situation that would warrant consideration of a multichannel coplacement, and would then send a control message to unit 224 to request the determination of the parameters that would enable a coplacement, the corresponding SUOC rate that would result, the anticipated FUOC adaptations that would result, and additional information useful to the decision making unit 226.

The decision making unit 226 may also provide control information to signal characterization unit 204 along path 232. The control information is used by signal characterization unit 204 to trigger it to provide specific output along path 214 at times this new parameter information is required by decision making unit 226 to perform the various decision making unit 226 functions that are described herein. The control information passed from decision making unit 226 to signal characterization unit 204 along path 232 may contain, but is not limited to, the following: 1) request for carrier frequency and bandwidth, modulation and received SNR for a single target FUOC or multiple target FUOCs; 2) request for transmit-SUOC received SNR, channel transfer function, carrier frequency, phase offset, baud timing offset corresponding to a single or multiple target FUOC channels; and 3) request for complete or partial list of received signal parameters for all or portions of RF spectrum reserved for use by the SUOC radio network.

It should be appreciated that decision making unit 226 is capable of using the target FUOC list and corresponding parameter information provided on signal path 214 along with the recommended transmit SUOC rates for each target FUOC or list of target FUOCs provided on signal path 228 to determine the best action for the transmit SUOC radio. This action is in the form of waveform choices, including, but not limited to rate of data transmission (bits per channel use or bits per Hertz) and transmit power.

Decision making unit 226 also determines transmit-SUOC transmit waveform parameters (including but not limited to carrier frequency, bandwidth, power and rate) and provides such information to the configurable radio 208 along signal path 160. Thus signal path 216 carries the output from decision making unit 226 (SUOC Transmit Waveform Parameters) that contains a single choice of target FUOC or a set of target FUOCs along with specific parameters that define the transmit-SUOC waveform to include rates, as well as the transmit powers to be used by the transmit-SUOC on each target FUOC channel that will be engaged in a coplacement SUOC link.

Configurable radio 208 receives RF signals from receive antenna 202, signal parameter data from the signal characterization unit 204, and decision information from the decision making unit 226. In response, the configurable radio 208 generates RF signals to be transmitted, which are provided to transmit antenna 210 via signal path 218. At a second output, configurable radio 208 provides a digital stream of bits (a "bit stream") demodulated and decoded from a transmit-SUOC signal of interest along signal path 222. This is the decoded bits associated with the transmission from the transmit-SUOC radio of interest to this receive-SUOC radio.

Figure 5:
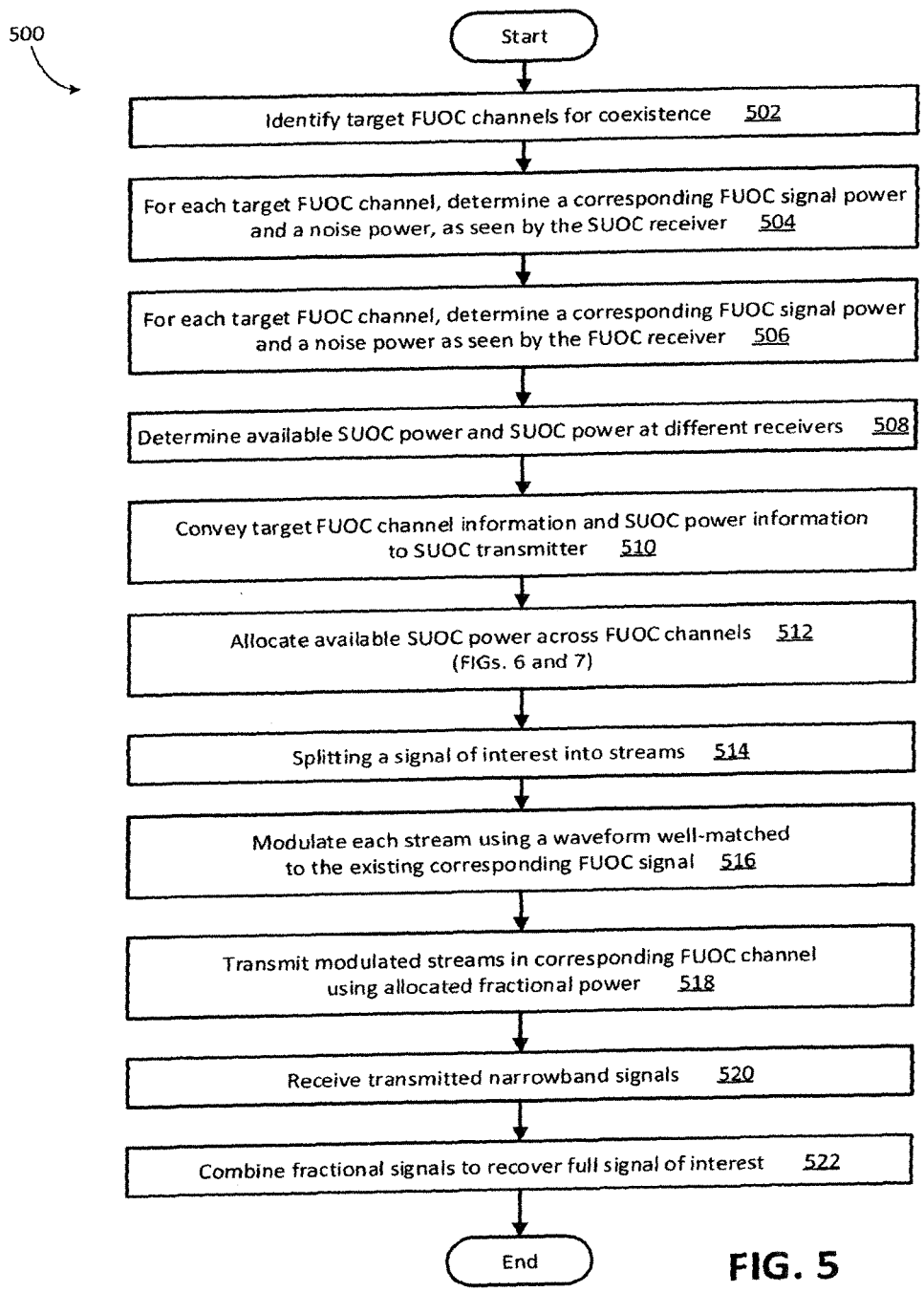
FIG. 5 is a flowchart illustrative a method for use within the system of FIG. 2.
Figure 6:
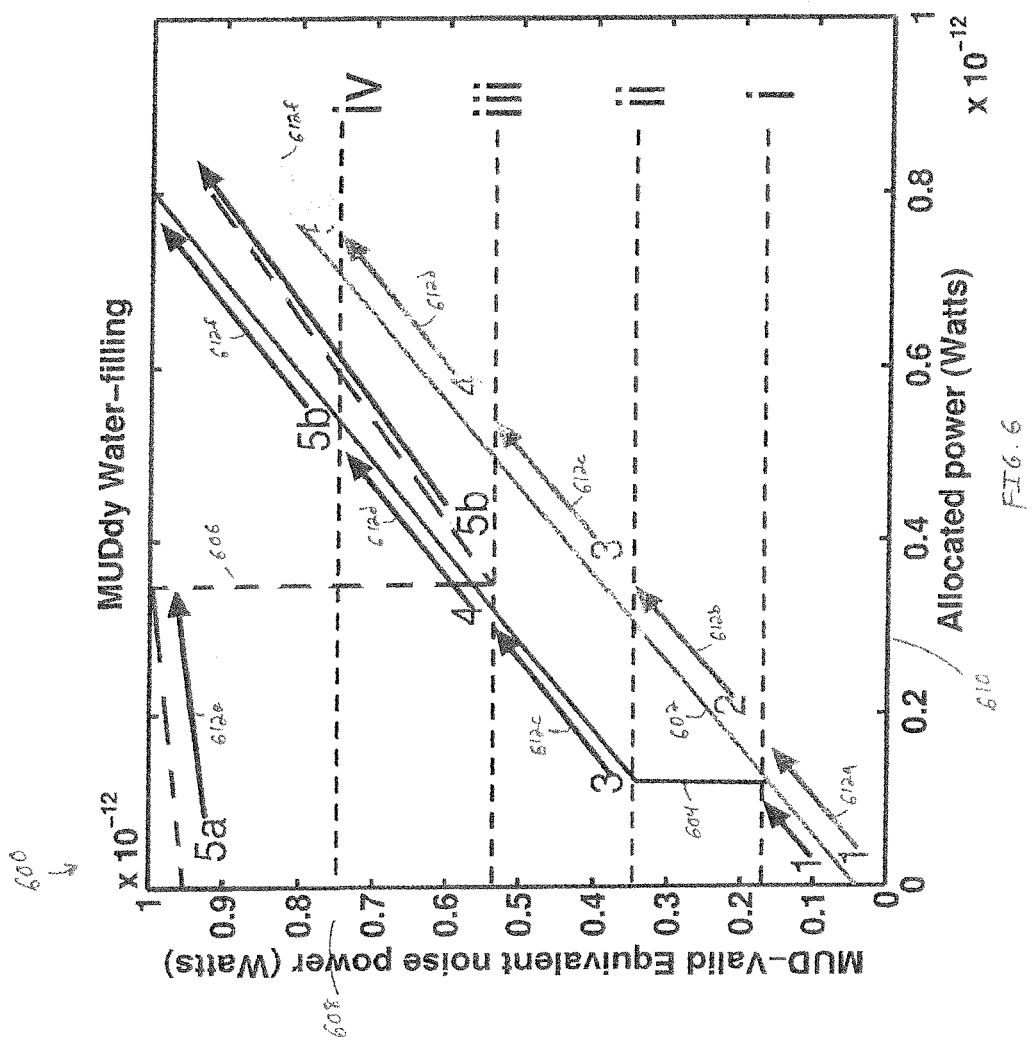
FIG. 6 is a graph illustrating a power allocation method for use within the system of FIG. 2.
Figure 7:
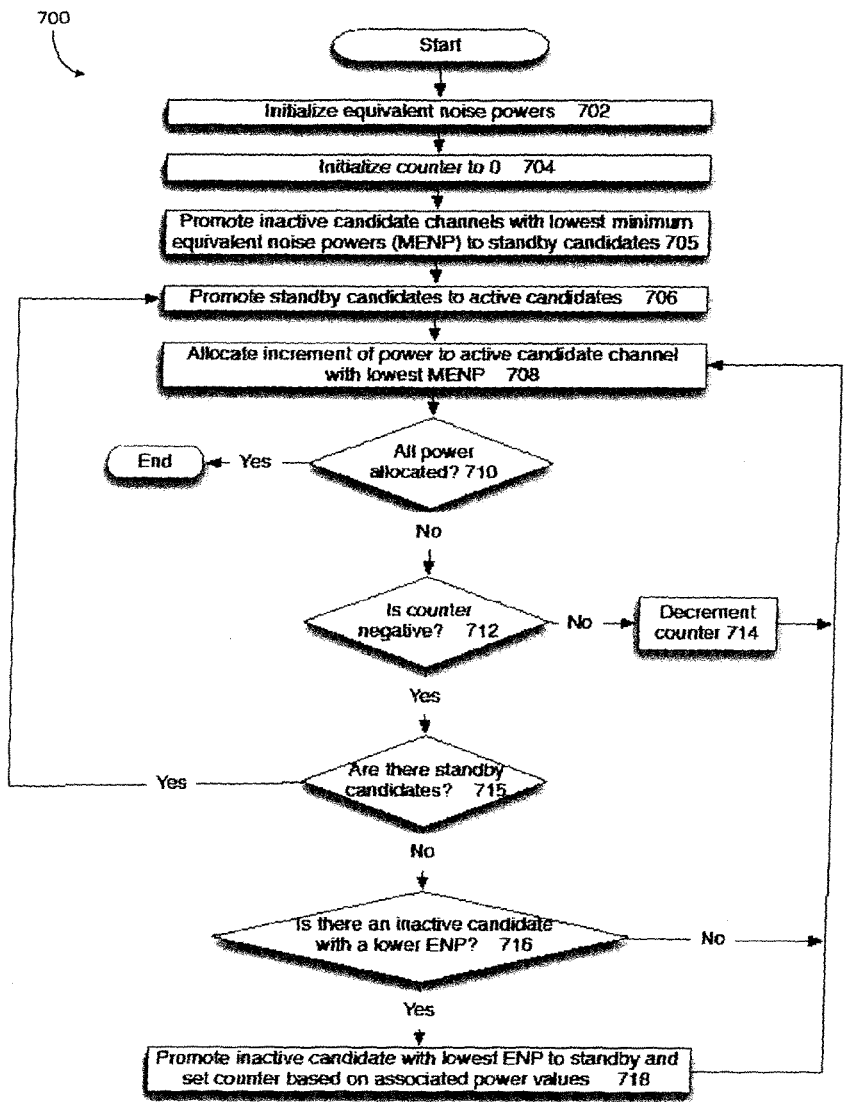
FIG. 7 is a flowchart illustrating a power allocation method for use within the system of FIG. 2.

It should be appreciated that the transmit-receive system 200 is capable of sensing the available spectrum and determining good candidate FUOC user bands in which this SUOC system could successfully communicate given the MUD available on the SUOC radio. The system 200 is capable of iterative transmission/probing, sensing, learning, and decision making, to bring about an acceptable communication rate for both the SUOC and the FUOC systems so that they utilize the same frequency bands for communication. The cognitive transmit-receive system 200 enables use of spectrum that is already being used by other radios. Illustrative processing which may be used within the system 200 is shown in FIGS. 5-7 and described below in conjunction therewith.

In various embodiments, the transmit-receive system 200 utilizes message fractionation and physical layer channel assignment to achieve co-existence communications in the presence of FUOCs. In particular, the cognitive engine 206 identifies a plurality of target FUOC channels suitable for coexistence. Using a power allocation technique (e.g., selfish power allocation method 700 described below in conjunction with FIG. 7), the cognitive engine 206 allocates a total available power across the target FUOC channels. This power allocation information can be provided to the configurable radio 208, which in turn separates a transmit signal into a plurality of streams, each stream associated with a FOUC channel onto which power has been allocated. The cognitive radio transmits each stream on the associated FUOC channel using the allocated power and using a modulation scheme well matched to an existing FUOC signal. On the receive side, the system 200 can receive the multiple streams in parallel and recombine the decoded signals to recover the full signal of interest. In some embodiments, the system 200 includes a plurality of MUD receivers to decode the streams in parallel.

Figure 3:
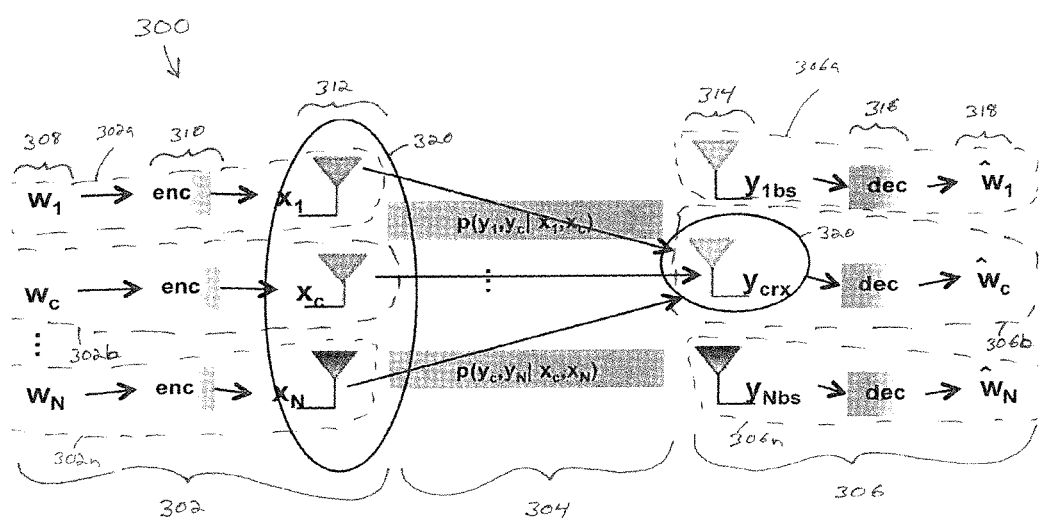
FIG. 3 is a diagram of an interference channel in which there are multiple transmit-receive pairs that are intending to communicate with each other, but each transmitter's signal can be heard by numerous receivers, not just the one that is intending to communicate with it.

Referring to FIG. 3, a generic interference channel model 300 characterizes interactions between SUOCs and FUOCs, and can be used to analyze coexistence strategies. The diagram 300 in FIG. 3 depicts an interference channel in which there are multiple transmit-receive pairs that are intending to communicate with each other.

Since each transmitter send a wireless signal that propagates out into the environment that is also occupied by more than just the intended receiver, each transmitter's signal is present at the antenna of numerous receivers. If the transmitters and receivers are all tuned to the same frequency band, each receiver will receive the intended signal of interest and all other signals transmitted in that band. Specifically, referring to FIG. 3, transmitter 302*a* is attempting to establish a link to receiver 306*a* via a wireless transmission, but receiver 306*b* also receives the transmission from transmitter 302*a*. Receiver 306*b* is intending to establish a link with transmitter 302*b*, but receives not only the signal from 302*b*, but also the signal from all other transmitters including 302*a* and 302*n*. The model 300 is a can accommodate the role of interference adaptation for nodes that are capable of adapting their waveform parameters such as modulation rate, code rate, and transmit power to help overcome link degradation caused by interference from other radio transmitters. The model 300 does not require or imply explicit cooperation between all nodes on the channel.

Unlike some existing techniques, the cognitive coexistence techniques described herein do not require explicit transmitter coordination, but generally do expect FUOC nodes to adhere to modern link maintenance protocols that would result in waveform adaptations when faced with varying conditions, such as introduction of interference. Accordingly, the interference channel model 300 is general and may include a restriction on transmitter coordination as well as the adaptive nature of the communicating nodes on the network.

The interference channel model 300 includes a plurality of transmitters 302, a channel 304, and a plurality of receivers 306. A transmitter 302 includes a data source (or "symbol source") 308, an encoder 310, and a transmit apparatus 312. A receiver 306 includes a receive apparatus 314, a decoder 316, and a data sink 318. In general, the network can include an arbitrary number of transmitters 302 and receivers 306, with three transmitters 302*a*, 302*b*, 302*n* and three receivers 306*a*, 306*b*, 306*n* shown in this example. Here, transmitter 302*b* and receiver 306*b* correspond to cognitive nodes, whereas the remaining nodes correspond to conventional rate-adaptive nodes. It should be appreciated that the cognitive nodes may correspond to one or more SUOCs (e.g., SUOCs 106 of FIG. 1), whereas the conventional rate-adapting nodes may correspond to one or more FUOCs (e.g., FUOCs 104 of FIG. 1).

The following requirements are imposed on the interference channel model 300: (a) cognitive nodes must transmit on the same bands as the conventional rate-adaptive nodes; (b) cognitive nodes cannot rely upon coordination, communication, or cooperation with conventional nodes; and (c) the adaptation process of the conventional nodes is deterministic, or reasonably well modeled by a deterministic process, given the relevant signal-to-noise ratios and the process is knowable to the cognitive node.

The following assumptions are made with respect to the interference channel model 300: (1) a cognitive node has knowledge of the received powers of the conventional transmitters and non-adaptive interference (i.e., noise) at both the conventional and cognitive receivers; (2) over some time scale of interest, the channel remains fixed; channel fading or time variation in the channel, depending upon how quickly these changes occur, may vitiate decisions made by the cognitive node;

Assumption (1) can be satisfied using a probing process. For example, referring to FIG. 1, a SUOC receiver 106*b* can receive RF signals transmitted from FUOC transmitters 104 and non-adaptive radios 108 and analyze these signals to determine signal power, noise power, waveforms, and other signal parameters. From these parameter estimates and from specific knowledge of how the FUOC system works or typical knowledge of how adaptive wireless communication systems work, determinations can be made as to the information assumed to be known in assumption (1).

In certain embodiments, assumption (2) can be relaxed without causing a significant effect on the performance results of the proposed invention. For example, assumption (2) can be relaxed by restricting potential applications to systems with channels having long coherence times, decisions based on old information will remain valid at least until a new decision is made.

When choosing the selfish strategy, a cognitive coexistence node is indifferent to the post-adaptation performance of all interfering conventional rate-adaptive nodes. Since this adaptation is assumed to be deterministic, the interference channel model for the case of selfish cognitive coexistence, as sensed by the cognitive receiver, reduces to include the nodes indicated by the circled portions 320 of FIG. 3.

It will be appreciated that for selfish coexistence channel model 300 is an adaptation of the well known multiple access channel. For selfish coexistence, the cognitive engine 206 (FIG. 2) attempts to optimize the SUOC rate subject to certain bounds, which can be understood in terms of the rate region of each cognitive node/interference node rate pair.

Figure 4:
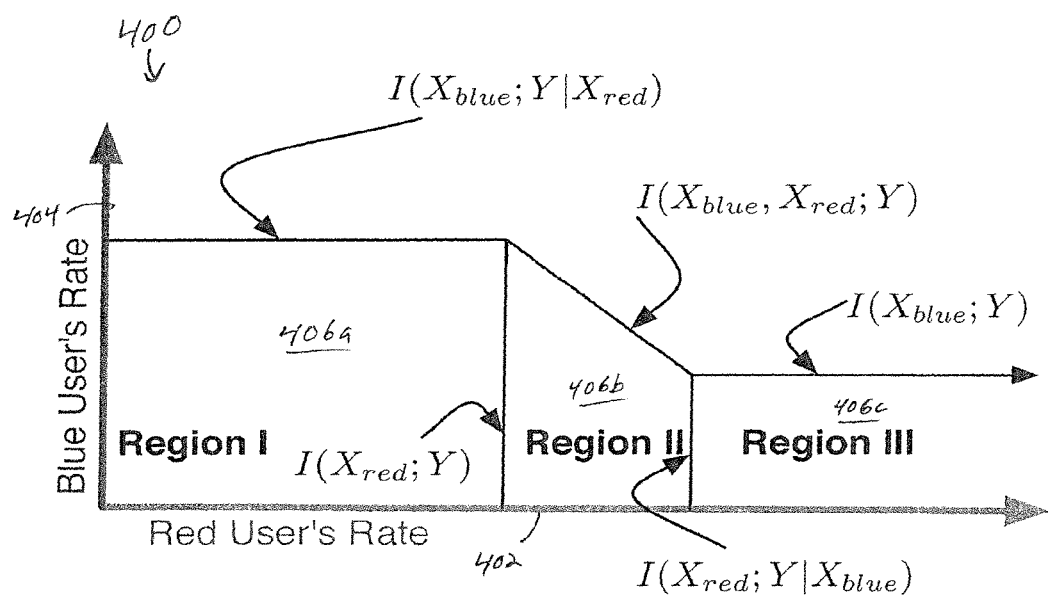
FIG. 4 is a diagram of a two-user achievable rate region.

FIG. 4 shows such a rate region 400 for a multiple access channel with two users: a red user and a blue user. The red user's rate is shown along the horizontal axis 402 and the blue user's rate is shown along the vertical axis 404. It will be appreciated that the red user may correspond to a FUOC and the blue user may correspond to cognitive SUOC The rate region 400 includes three sub-regions denoted "region I" 406a, "region II" 406b, and "region III" 406c. Rate region I 406a encloses those rate pairs where the red user's rate is below that supportable by a red-centric MMSE filter at the blue receiver, i.e. when $R_{red} \leq I(X_{red};Y)$, the blue user can achieve its full interference free rate, $R_{blue} \leq I(X_{blue}; Y|X_{red})$.

Rate region II 406b encloses those rate pairs where the red user's rate exceeds that supportable by a red-centric MMSE filter but still falls within the achievable rate bound for interference free transmission, $I(X_{red};Y) < R_{red} \leq I(X_{red}; Y|X_{blue})$. In other words, if the red transmitter's signal were meant for the blue receiver, region II 406b encompasses the rate of the red user that is higher than what is possible if the blue receiver used a red-centric MMSE MUD (in the presence of interference from the blue user) and lower than the rate possible if the blue receiver used a red-matched filter (in the absence of interference from the blue user). For red rates in this region 406b, the maximum blue user achievable rate is $R_{blue} \leq I(X_{red}, X_{blue}; Y) - R_{red}$.

Rate region III 406c corresponds to the case where the red user transmits at a rate exceeding the interference free bound. Here, the blue receiver can treat the red transmitter's signal as noise and the maximum blue user achievable rate is $R_{blue} \leq I(X_{blue}; Y)$.

In view of the model 300 of FIG. 3 and the rate region 400 of FIG. 4, it is appreciated herein that the MUD receiver complexity and sophistication needed to successfully demodulate interfering signals is dependent upon the interference structure and dynamic range between the signals that must be processed together in a single MUD branch. Because it is assumed with the model 300 that the FUOCs are not explicitly cooperating with the SUOCs, the primary design parameters available to help enforce a realistic MUD receiver are those defining the waveform used for transmission between cognitive SUOC nodes.

By way of example, consider a cognitive node that chooses to transmit using an ultrawideband or spread spectrum signal spanning the bands of K FUOCs (where K is some number of FUOCs that can be identified by a SUOC greater than or equal to one). Such a choice would force the cognitive SUOC receiver to receive a wideband with potentially unrealistic dynamic range to linearly span the range between the highest power received interfering signal and the lowest interfering signal and/or signal of interest. Further, such a scheme of spreading across K FUOC channels may require a computationally expensive MUD capable of jointly detecting K+1 signals in order to successfully receive the signal of interest.

It is appreciated herein that both issues can be avoided if the SUOC separates its transmit signal into K streams and co-places the streams onto FUOC channels to create K 2-signal pairs (i.e., one signal of interest and one interfering signal). This communication scheme, referred to herein as "cognitive coplacement," is illustrated in FIGS. 5-7 and described below in conjunction therewith. In some embodiments, each stream is modulated using waveforms well-matched to an existing interfering signal. As discussed below, modulating using waveforms well-matched to existing interfering signals may improve performance when conventional MUDs are used.

FIGS. 5 and 7 are flowcharts showing illustrative processing that can be implemented within a cognitive transmit-receive system (e.g., system 200 of FIG. 2). Rectangular elements (typified by element 502 in FIG. 5), herein denoted "processing blocks," represent computer software instructions or groups of instructions. Diamond shaped elements (typified by element 710 in FIG. 7), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

In some embodiments, the processing and decision blocks represent states and transitions, respectively, within a finite-state machine, which can be implemented in software and/or hardware.

The following techniques described in conjunction with FIGS. 5-7 may be implemented within a cognitive radio (e.g., a SUOC node 106 in FIG. 1) and, more particularly, within a cognitive transmit-receive system (e.g., system 200 of FIG. 2). Accordingly, the following description of FIGS.

5-7 refers to various elements shown in FIGS. 1 and 2 and described above in conjunction therewith.

Referring to FIG. 5, an illustrative method 500 utilizes cognitive coplacement to enable a SUOC to co-exist in one or more FUOC channels. At block 502, one or more target FUOC channels are identified. In some embodiments, a cognitive radio scans the RF spectrum and looking for suitable FUOC channels in which to coexist. A suitable FUOC is any FUOC that is known to adapt to the presence of interference for which signal parameters required to perform MUD can be reasonably well estimated.

In addition to determine the frequency band for each FUOC channel, the signal characterization unit 204 may be employed to determine various other signal parameters, as discussed above in conjunction with FIG. 2. For example, carrier frequency, a signal modulation type (e.g. QPSK), received signal signature pulse shape (e.g. root raised cosine), received power, timing offset relative to reference, received phase offset relative to reference, channel multipath structure, spreading code if one is used, frame or packet structure, and/or medium access control structure may be determined. Such parameters can be used by a SUOC transmit node to modulate signals using waveforms well-matched to existing FUOC signals, as described below in conjunction with block 516.

At block 504, for each target FUOC channel i, a corresponding FUOC signal power as seen by the SUOC receiver (denoted $P_i^{rx}$) and a corresponding noise power as seen by the SUOC receiver (denoted $N_i^{rx}$) are determined. These values can be measured directly at the SUOC receive node (e.g. node 106b in FIG. 1), where the FUOC received power $P_i^{rx}$ is the power of the ith FUOC's transmitted signal that makes it through the SUOC receive filter, and the noise power $N_i^{rx}$ is the power in the ith channel due to receiver noise and any ambient noise that makes it through the SUOC receive filter for the ith channel. The noise power $N_i^{rx}$ may include noise introduced into the ith FUOC channel by one or more non-adaptive radios 108 that are in the local environment that are not explicitly being treated as other signals that the MUD receiver would mitigate. The measured FUOC powers and noise powers can be shared with the SUOC transmit node and used for cognitive coplacement, as described below.

At block 506, for each target FUOC channel i, a corresponding FUOC signal power as seen by the FUOC receiver (denoted $P_i^{bs}$) and a corresponding noise power as seen by the FUOC receiver (denoted $N_i^{bs}$) are determined. The FUOC receiver may correspond to base station 102 of FIG. 1. In some embodiments, the FUOC receiver directly measures $P_i^{bs}$ and transmits this information in away that allows it to be received by one or more SUOC node. However, it will be appreciated that it may be desirable to perform block 506 (along with blocks 502 and 504) at a SUOC node without requiring the FUOC node to transmit this information. According, in other embodiments, the values $P_i^{bs}$ and $N_i^{bs}$ are estimated at a cognitive SUOC node using a probing process. For example, referring to FIG. 1, a SUOC receiver 106b can receive RF signals transmitted from FUOC transmitters 104 and non-adaptive radios 108 and analyze these signals to determine signal power, noise power, waveforms, rate and other signal parameters. From these parameter estimates and from specific knowledge of how the FUOC system works or typical knowledge of how adaptive wireless communication systems work, determinations can be made as to the values $P_i^{bs}$ and $N_i^{bs}$. An alternative to requiring specific knowledge about the FUOC's adaptation process or having to rely upon a generic one, the SUOC could transmit probe signals and monitor the FUOC behavior to determine the adaptation process and to estimate the received power profile at the FUOC receiver.

For each target FUOC channel i, the ratio of the FUOC signal power at the FUOC receiver and the FUOC signal power at the SUOC receiver can be expressed as $$\alpha_i = \frac{P_i^{bs}}{P_i^{rx}}.$$

Likewise, the ratio of the noise power at the common FUOC receiver and at the SUOC receiver can be expressed as $$\gamma_i = \frac{N_i^{bs}}{N_i^{rx}}.$$

At block 508, an available SUOC power (denoted $P_{K+1}$) is determined. The available SUOC power $P_{K+1}$ may correspond to the total power available at the SUOC transmitter. The total power available to the SUOC transmitter depends upon the amplifier, antenna, and battery or energy source, as well as a possible maximum value restriction on maximum output power either determined by the SUOC in order to minimize or otherwise control the harm it inflicts on other receivers or it might be determined by the FCC or specification for the system or network of which that SUOC is a part.

In addition, a total SUOC power as seen by the SUOC receiver (denoted $P_{K+1}^{rx}$) and a total SUOC power as seen by the FUOC receiver (denoted $P_{K+1}^{bs}$) are determined. The total SUOC power as seen by the SUOC and FUOC receivers is the power due to the transmitted signals from the single SUOC across all the FUOC channels with which this SUOC has been coplaced. For example, if the FUOC links comprise a set of K FDMA links and the SUOC transmitter simultaneously sends its signal in the K disjoint frequency bands that match each of the K FUOC links, $P_{K+1}^{rx}$, is the total power due to the K-bands of SUOC transmitted signal as seen at the SUOC receiver in all K bands. This value can be predicted using the known transmit power and frequencies that will be used by the SUOC transmitter and any information about the channel between the SUOC transmitter and SUOC receiver learned from previous transmission from the SUOC transmitter to the SUOC receiver. Alternatively, it can be measured using probe signal transmissions or training signals transmitted from the SUOC transmitter to the SUOC receiver at or close to the time this value is needed for the computation. The SUOC received power as seen at the FUOC receiver could be estimated or predicted in any number of ways, to include use of an initialization process in which the SUOC nodes probe the FUOC channels and compute estimates of $P_{K+1}^{bs}$ the observed modulation and or code rate changes in the FUOC links in the absence of and in the presence of the SUOC probe signals. Alternatively, some FUOC systems may transmit link quality metrics, which could be received and decoded by the SUOC to learn the changes in the FUOC perceived SNR. The change is known by the SUOC to be due to the SUOC probe signal and can be converted to an estimate for $P_{K+1}^{bs}$.

The ratio of the SUOC power at the FUOC receiver and the SUOC power at the SUOC receiver can be expressed as $$\beta = \frac{P_{K+1}^{bs}}{P_{K+1}^{rx}}.$$

In various embodiments, at least some of the processing described above (e.g., the processing of blocks 502-508) is performed at the SUOC receiver, whereas other processing (e.g., the processing of blocks 512-518) is performed at the SUOC transmitter. To allow such operation, control information and other pertinent parameter values determined or obtained at one SUOC node may be transmitted to the other SUOC node. This could be done over a control channel, separate from the channel (or channels) used for normal SUOC communication. Such information may include the list of target FUOC and, for each FUOC channel i, the channels' defining parameters (e.g. for the case of FDMA, the channel's band), one or more signal waveform parameters, the FUOC signal power as seen by the SUOC receiver $P_i^{rx}$, the noise power as seen by the SUOC receiver $N_i^{rx}$, the ratio of the FUOC signal power $\alpha_i$, and ratio of the noise power $\gamma_i$. The conveyed information may also include the available SUOC power $P_{K+1}$, the SUOC power as seen by the SUOC receiver $P_{K+1}^{rx}$, and the SUOC power as seen by the FUOC receiver $P_{K+1}^{bs}$.

At block 512, the total SUOC power $P_{K+1}$ is allocated across the target FUOC channels. A fraction of the total available power (denoted $k_i$) is allocated to each channel i using a suitable power allocation method. In various embodiments, the processing of block 512 makes use of the selfish power allocation technique referred to as "MUDdy water-filling," which is described below in conjunction with FIGS. 6 and 7. The FUOC channels onto which a non-zero fraction of the total available power has been allocated are referred as the "assigned channels."

At block 514, a transmit signal (sometimes referred to as the "signal of interest") is comprised of one or more parts which can be thought of as being one or more signals emanating from the same transmitter, one for each assigned FUOC channel. Any suitable technique can be used to create the aggregate transmit signal, such as frequency-division multiplexing (FDM), time division multiplexing (TDM), or polarization division multiplexing, or combinations thereof. It is also suitable for the aggregate transmission to be constructed by transmitting from distinctly separate radio nodes in which one or more helper transmit nodes is employed by a SUOC to transmit a portion of the SUOC's data as a relay node coordinated to transmit on one or more specific FUOC matched channels.

At block 516, each stream is modulated using a waveform well-matched to the existing corresponding FUOC signal. As used herein, the term "waveform" may refer to the general shape of a signal, as determined by its pulse and signature, as well as frequency band and/or time slot or other characteristics that describe the transmitted signal used to modulate the data. The SUOC signal is said to be "well-matched" to the FUOC signal if it interferes only with that FUOC signal and does not interfere with the other FUOC signals, regardless of whether it has the same pulse or baud timing, and may even use entirely different modulation and coding. It is appreciated herein that transmitting SUOC signals that are well-matched to existing FUOC signals can facilitate implementable MUDs, thus reducing power and computational requirements at the cognitive SUOC receiver. However, it is further appreciated herein that a MUD receiver may exhibit poor performance when decoding two received signals that result from the transmitters utilizing two identical waveforms (worst case occurs when the correlation between the two interfering received waveforms is high, with the maximum possible value being $\rho=1$) and thus, in some embodiments, the SUOC signal is chosen to be well-matched as defined above, but with correlation $\rho<1$. In some instances, a favorable cross correlation (the positive performance effects of which begin to be noticed for $\rho \leq 0.9$) may be possible even with similar pulse and baud choices if the FUOC and SUOC signals are being received through different multipath channels, thus rendering their received signals to have a lower cross correlation than would be the case if they experienced the same channel transfer function. This proposed invention also applies to receivers with multiple antennas; multiple antennas would provide for another means for the two received signals to have a favorable cross correlation either due to differences in polarization for the case of dual polarized reception or physical location for the case of separate receive antennas spaced at or greater than half the carrier wavelength.

At block 518, the SUOC transmit node transmits each modulated stream as a signal in the corresponding FUOC channel, using the allocated fractional power. If, for example, the FUOC multiple access network employed frequency division multiple access, each different FUOC channel would comprise a distinct frequency band. Each FUOC transmission would be a continuously modulated signal constrained to a specific frequency band. In this case, the SUOC node would transmit K different signals, one in each of the FUOC bands. The SUOC signals need not have the same baud rate nor does it need to have the same modulation as the FUOC to which it is matched. The only requirement is for the K different SUOC transmissions emanating from the single SUOC transmitter to interfere only with their "matched" FUOC channels. The rate of each of the SUOC signal streams is the result of the coding and modulation for that stream and is determined by the received SUOC power and matched FUOC power in that channel.

At block 520, a SUOC receive node can receive the signals transmitted by the SUOC transmitter in each of the FUOC channels using a MUD receiver. At block 522, the received signals can be combined (e.g., demultiplexed) to recover the information sent by the SUOC of interest. If the FUOC channels are different frequency bands, it will be appreciated that the SUOC transmit node can transmit multiple streams (or all streams) in parallel over the corresponding FUOC bands. If the FUOC channels are different polarizations, it will be appreciated that the SUOC transmit node can transmit two streams, on in each polarization to match the polarization of the FUOC channels. The SUOC transmitter can likewise receive and decode the multiple streams in parallel and recombine the decoded signals to recover the full message of interest. If the FUOC channels are different time slots, it will be appreciated that the SUOC transmit node can transmit multiple frames, each matched to a specific, typically recurring, time slot.

It will be appreciated that the method 500 enables allocation of source data or source data that has been interleaved, encrypted, encoded, or otherwise enhanced or manipulated into multiple disjoint data streams chosen to be transmitted by signaling schemes that co-place each disjoint transmission on top of a pre-existing conventional rate adapting radio link. In contrast to conventional ultra wideband or spread spectrum techniques, cognitive coplacement allows for parallel implementation of 2-user moderate dynamic range MUD processing algorithms.

The optimal MUD-enabled power allocation for SUOC coplacement on FUOC channels has some intuitive similarities to the well known water-filling result for placement of a signal in a noisy channel, where no MUD receiver is assumed and where the noise does not adapt to the placement of the signal. Moreover, the MUD-enabled power allocation described herein reduces to traditional water filling when the FUOC is not adaptive and when the SUOC does not have a MUD. For these reasons, the solution presented is referred to herein as "MUDdy water-filling."

The MUDdy water-filling solution is obtained by optimizing the following equation to obtain the set of values $\{k_1, \ldots, k_K\}$ subject to a total power allocation constraint:

$$\underset{\{k_1,\ldots,k_K\}}{\text{maximize}} \sum_{i=1}^{K} C_{K+1,i}(k_i) \qquad (1)$$

$$\text{subject to } \sum_{i=1}^{K} k_i = 1,$$

where $$C_{K+1i} = \begin{cases} C_{K+1,i}^{(1)} & k_i \geq \dfrac{N_i}{P_{K+1}} \dfrac{\alpha_i - \gamma_i}{\beta - \alpha_i} \\ C_{K+1,i}^{(2)} & \dfrac{N_i}{P_{K+1}} \dfrac{\alpha_i - \gamma_i}{\beta - \alpha_i} \geq k_i \geq \dfrac{N_i}{P_{k+1}} \dfrac{\alpha_i - \gamma_i}{\beta} \\ C_{K+1,i}^{(3)} & k_i \leq \dfrac{N_i}{P_{K+1}} \dfrac{\alpha_i - \gamma_i}{\beta} \end{cases} \qquad (2)$$

where the terms $P_{K+1}$, $\alpha_i$, $\beta$, $\gamma_i$ are defined above in conjunction with FIG. 5, $N_i$ is shorthand for $N_i^{rx}$ as defined above, and $k_i$ is the fraction of the total SUOC's power s1 allocated to the FUOC's ith channel by the cognitive SUOC node and ranges from zero to one.

The optimal solution described above or suboptimal variants may be used within the cognitive coplacement method 500 of FIG. 5 (e.g., within block 512). It will be appreciated that computing the optimal solution for power allocation by optimization of equation (1) with the definitions of equation (2) requires solving a system of cubic equations. Practical implementations will be required. Two such practical methods are illustrated in FIGS. 6 and 7. These methods to computing a MUDdy waterfilling power assignment for coplacement of SUOC signals in FUOC channels differ slightly, but both result in selfish power allocation motivated by the optimal solution represented by equations (1) and (2). The power allocation techniques of FIGS. 6 and 7 are based upon adaptations of the well known intuitive description of water-filling to incorporate the definition in (2) that account for the effects of both having a MUD receiver in the SUOC and the ability for the FUOC nodes to react to SUOC power placed in their channels.

The water-filling solution to the conventional power allocation problem can be reached by applying a "thought experiment" that is a recursive process that progresses from solving the problem with a small power available to the transmitter, and incrementally increasing that power by small amounts, and applying each new small amount of power. Specifically, the thought experiment prescribes placing each new increment of available transmit power ΔP on the channel with the lowest total energy (i.e., signal+interference+noise). The traditional water-filling result can be understood through consideration of an example with K conventional additive white Gaussian noise (AWGN) channels, each channel containing only noise, but with different noise powers $N_k$. The capacity of the kth channel is denoted $C_k$. It has been shown that an optimal strategy is to assign each marginal increment of power ΔP to the channel with the lowest cumulative equivalent noise $N_k^{(eq)}$, which is defined for a conventional AWGN channel k as $N_k^{(eq)} = P_k + N_k$, where $P_k$ represents the power allocated to the channel up to but not including the most recent power increment under consideration, and $N_k$ represents the white Gaussian noise on the channel. It is appreciated that the conventional water-filling solution strategy should be modified in the case where MUD-enabled SUOC nodes and rate-adapting FUOC nodes are present.

A power allocation method for use by a SUOC having a MUD-enabled receiver should take into account the opportunity that a MUD-enabled receiver provides. MUD-enabled rate depends upon interference SNR and the interferer's rate. Moreover, in cases where the interferer's rate is designed to adjust to maintain its own link in the presence of a SUOC's emission, the MUD-enabled opportunity "before" SUOC co-location and "after" SUOC co-location will often be different. To adapt conventional water-filling for the multiband cognitive coexistence channel, MUD receiver equivalent noise $N_i^{(eq)}$ power (ENP) can be define by the following equation (3):

$$N_i^{(eq)} = \begin{cases} k_i P_{K+1} + N_i, & \text{if } k_i \geq \dfrac{N_i}{P_{K+1}} \dfrac{\alpha_i - \gamma_i}{\beta - \alpha_i} \\ \left(\dfrac{1}{k_i P_{K+1} + N_i/\beta} + \dfrac{1}{k_i P_{K+1} + \gamma_i N_i/\beta + \alpha_i P_i/\beta} + \dfrac{1}{k_i P_{K+1} + P_i + N_i}\right)^{-1}, & \text{if } \dfrac{N_i}{P_{K+1}} \dfrac{\alpha_i - \gamma_i}{\beta - \alpha_i} \geq k_i \geq \dfrac{N_i}{P_{K+1}} \dfrac{\alpha_i - \gamma_i}{\beta} \\ k_i P_{K+1} + P_i + N_i, & \text{if } k_i \leq \dfrac{N_i}{P_{K+1}}, \dfrac{\alpha_i - \gamma_i}{\beta} \end{cases}$$

where the terms $P_{K+1}$, $\beta$, $\gamma_i$ are defined above in conjunction with FIG. 5. $P_i$ is shorthand for $P_i^{rx}$ previously defined above. $N_i$ and $k_i$ are as defined in association with the description of equations (1) and (2) above. The MUDdy water-filling solution is one that results in "filling" the channels with the lowest ENP first and then moving on to fill the others as the ENP of those originally filled channels rises to meet the ENP of the originally higher ENP channels. The difference between MUDdy water-filling and traditional water-filling, is that the MUD-receiver equivalent noise power (ENP) for any given channel does not monotonically increase as a function of added power (as is the case for the non MUD-enabled scenario for which ordinary water-filling simply examines total power in the channel.) There are discontinuous jumps in how a MUD-enabled cognitive receiver perceives a coexistence opportunity, corresponding to the points where channels cross boundaries between different rate regions (e.g., between the rate regions 406a-406c in FIG. 4). Specifically, equation (3) has three options for computing the noise $N_i^{(eq)}$ depending upon the allocation of SUOC power to channel i. These three options correspond to the three different subportions of the rate region that exists for FUOC in the ith channel and the SUOC in the ith channel (generic example of such a rate region is shown in FIG. 4).

Referring to FIG. 6, a power allocation method is illustrated using an allocated power versus equivalent noise power (ENP) graph 600. The vertical axis 608 corresponds to the ENP (equation (3)) for each channel i, and the horizontal axis 610 corresponds to power allocated ($P_i$) to that channel. The plot must first be created by computing the value of equation (3) for each FUOC channel upon which the SUOC is considering co-placing its link. $N_i^{(eq)}$ can be plotted for each channel i=602, 604, and 606 shown in FIG. 6.

There are three lines in the example for which the plot of FIG. 6 is shown. The dashed line 606 illustrates an example of how each ENP function would be computed. The ticked-line labeled 606 is the value of $N_i^{(eq)}$ for i=606 (also referred to as ENP), as a function of the amount of SUOC power that is allocated to this channel. Equation (3) was used to compute the y-axis value, and the x-axis value is $k_{606}$, $P_{K+1}$ (the amount of SUOC power in channel 606.) When no SUOC power is allocated to channel 606, the ENP is 0.96 picowatts. As SUOC power is added to channel 606, the ENP increases to a maximum value of 1 picowatt. This segment of the ENP for channel 606 is indicated with the arrow labeled 5a in FIG. 6. This maximum ENP for channel 606 occurs when the SUOC power allocated to this channel is 0.35 picowatts. After this point, when additional SUOC power is added to channel 606, the ENP for this channel abruptly changes to a much lower value, 0.54 picowatts. After this point, as additional SUOC power is added to channel 606, the ENP continues to rise. This portion of the ENP for channel 606 is the portion of the ticked-line indicated with the arrow labeled 5b. The abrupt change in the line 606 is due to an abrupt change in the active subportion of the rate region (generic example of which is shown in FIG. 4) that corresponds to the FUOC link in channel 606 and the SUOC link in that same channel. The abrupt change in ENP for channel 606 is due to the FUOC adapting its rate in reaction to the SUOC interference as that interference is increased. In this example, when the SUOC has allocated between 0 and 0.35 picowatts to the FUOC channel 606, the FUOC transmitter using that channel can establish a link with the FUOC receiver using a rate that falls on the x-axis of FIG. 4 corresponding to Region III. When the SUOC has allocated more than 0.35 picowatts to channel 606, the FUOC transmitter on channel 606 adapts to maintain its link with the FUOC receiver by reducing its rate such that its new rate now falls within subportion of rate region labeled Region II in FIG. 4. Up until a SUOC power of 0.35 piowatts, the FUOC on channel 606 experiencing interference from the SUOC did not have a need to change its rate. It should be clear from this explanation that in order to compute the ENP vs SUOC allocation power plot for a given FUOC, the rate adaptation rule for that FUOC would need to be given either by a known mapping or one that is considered to be a good representative typical for the FUOC under consideration for coplacement.

As described above, $N_i^{(eq)}$ would be computed and plotted for each of the channels, i, that are potential FUOC channels for SUOC coplacement. The MUDdy water-filling choice for SUOC power allocation among the FUOC channels can be achieved via an algorithm that may be performed by using the ENP vs. SUOC power plots as explained below. This example approach to the MUDdy water-filling algorithm is for illustrative purposes. It should be appreciated that any means for arriving at the same or nearly the same result, whether the procedure resemble the example that steps through the information contained in the plot or computes values using equation (3) and compares them in an efficient way to arrive at the solution which "fills" the channels from lowest to highest ENP is covered by this patent.

The example corresponding to FIG. 6 shows the mechanics of MUDdy water-filling for a communications network of three interferers (i.e., three FUOC transmitters and one FUOC receiver), one cognitive transmitter (i.e., one SUOC transmitter), and a corresponding cognitive MUD receiver (i.e., a SUOC receiver). The algorithm is explained below as if it is a step by step probing of the environment and power allocation reaction process that would be carried out in real time, however the algorithm could be implemented as a simulation in the cognitive radio processing unit, resulting in the determination of power allocation that results at the end of the step by step process. Alternative algorithms need not be based upon a stepping through information on a plot and may manipulate equation (3) directly.

Referring to FIG. 6, three FUOCs operate in orthogonal channels identified by the numbers 602, 604 and 606. The ENPs for each these channels has been computed as a function of SUOC assigned power to each channel and are shown by respective lines 602, 604, and 606. The intersection of each channel line 602-606 with the vertical axis 608 corresponds to the initial noise level present in each of the channels (e.g., noise due to the receiver circuit noise and from non-adaptive inference 108 in FIG. 1 before the SUOC begins to transmit). The general approach for understanding MUDdy water-filling is to start by assuming the SUOC is not transmitting, thus there is no SUOC power and focus can be placed on the value of the three lines at the x-axis value of zero picowatts. The next step in understanding is to consider what would happen if SUOC power is added in small increments, in a stepwise fashion. At each step, using the MUDdy water-filling rules, SUOC power is allocated to the channel (or channels) having the lowest ENP.

In this example, SUOC power allocation can be understood in terms of six stages 612a-612f. During stage 612a, shown by the two arrows labeled "1," channels 602 and 604 have identical ENP, which is also the lowest ENP, and thus power may be distributed equally between these two channels. During the first stage 612a, a rate region could be constructed for each FUOC-SUOC interfering pair, and in this first stage for this example the specific realization of the rate regions are different, as they would be in general. The subportion of the rate region in force for channels 602, 604 due to the rates of the signal transmitted in FUOC channels 602 and 604 happened to be the subportion labeled rate region II (e.g., region 406b in FIG. 4) for both FUOC 602 and 604. The choice of what is computed for the ENP of equation (3), $N_i^{(eq)}$, for i=602 and 604 in this case is the middle equation that corresponds to rate region II.

Following along the two arrows labeled "1" in the figure corresponds to SUOC power being added to both channels 602 and 604 in equal amounts until the point at which an abrupt change occurs in the ENP for one of the channels under consideration for coplacement. In this example, this occurs when the channels 602 and 604 have an ENP at the level indicated by the dashed horizontal line "i" and when the SUOC allocated power is equal to 0.12 picowatts in each of the channels 604 and 602.

Past this point, the addition of signal power into channel 604 by the SUOC node would cause this channel to transition into rate region I (e.g., region 406a in FIG. 4), triggering a discontinuous jump in its ENP as shown. The change in subportion of the rate region is due to the FUOC adapting its rate in reaction to the increased SUOC interference. In this example, when the SUOC has allocated 0.12 picowatts to each of the two FUOC channels, FUOC on channel 604 needs to reduce its rate to maintain a link with the FUOC receiver. This new rate for FUOC on channel 604 is lowered such that its new rate now falls within the subportion of rate region labeled Region I in FIG. 4. Up until this point, the two FUOCs experiencing interference from the SUOC did not have a need to change their rates. During this pre-0.12 picowatts power allocation stage, the ENPs for these two channels were lower than the ENP for the FUOC channel 606, and the algorithm continued to increase the SUOC powers assigned to FUOC channels 602 and 604.

Once a FUOC rate transitions from one subportion rate region to another, the equation used to compute the ENP abruptly changes to a different equation as is indicated in equation (3).

The example continues at stage 612*b* of the power increment assignment algorithm. Starting at the point where the SUOC allocated power for each channel is 0.12 picowatts, channel 604 has a higher ENP than channel 602. From this point moving forward, shown by arrow "2," the stepwise MUDdy water-filling method allocates all of its incremental power to channel 602. During stage 612*b*, the amount of power allocated to channel 604 is unchanged. Incremental power allocation to channel 602 continues until this channel's ENP is the same as the ENP for channel 604. This ENP value is indicated by horizontal dashed line "ii" and happens when the total power allocated to FUOC channel 602 is 0.3 picowatts. At this point, the total allocated power is 0.42 picowatts, 0.3 picowatts for channel 602 and 0.12 picowatts for channel 604. If all of that 0.42 picowatts of allocated power to had instead been assigned to channel 606, the ENP for channel 606 would transitioned to a much lower line than its initial value, however, since that line is did not come down to match the ENP max value for stage 612*b* as indicated by dashed line ii, the algorithm continues to consider only channels 604 and 602 for stage 612*b*.

The example may proceed to stage 612*c*. During stage 612*c*, shown by the arrows labeled "3," incremental power may again be assigned equally to both channels 602 and 604 since they have the same value and slope throughout stage 612*c*, and the third channel, 606, has a higher ENP even if all the power allocated to 602 and 604 were instead allocated to 606, 606 is still not considered as a contender during this stage. The equal allocation of additional power to 602 and 604 continues until the point at which an abrupt change occurs in the ENP for any one of the three multiple channels under consideration for coplacement. This change occurs in channel 606 at and ENP value indicated by dashed line "iii."

Next, the example moves to stage 612*d*. The ENP for channel 606 as a function of SUOC power level in that channel is shown by the line labeled 606. For channel 606, an abrupt change occurs when the SUOC power in that channel is 0.35 picowatts, indicated by horizontal dashed line "iii."

At this point in the example, if 0.35 picowatts of additional power were instantly available and been allocated to channel 606, that link's rate would abruptly change to accommodate the interference to its link. This in turn would trigger the rate region in force for that link to change from rate region III to rate region II (e.g., from region 406*c* to region 406*b* in FIG. 4). This also corresponds to a significant decrease in the ENP for link 606, hence the abrupt downward step of line 606 shown in the figure. Thus, if 0.35 picowatts of additional power (over and above what has already been assigned to channels 602 and 604 at this point) was available and assigned to channel 606, that channel goes from being the least desirable to being on par with the other candidate channels 602, 604 for additional increments of power. However, up until a total additional power of 0.35 picowatts is available, the same two channels, 602 and 604 are still the best options for allocation of additional power increments. Stage 612*d*, shown by the arrows labeled "4," corresponds to this stage of incrementing the additional power from the 0.82 picowatts at the end of stage 612*c* to an additional 0.35 picowatts. This stage begins once channel 606 undergoes such a transition. Here, the mechanics of MUDdy water-filling dictate that the channel 606 be ignored as an option for power allocation until at least 0.35 W is accumulated (in the virtual sense) as the stepwise method progresses. If the total available power is reached before reaching the end of stage 612*d*, then it is preferable to keep the allocations as indicated with arrows labeled "1," "2," "3," and "4." The reason for this is that in order to bring about the behavior of channel 606, much of the power that had been previously allotted to channels 602, 604 would have to be abandoned, and the gains made with those channels would be lost.

At the end of stage 612*d* and before the beginning of stage 612*f*, there is sufficient additional power allotted during stage 612*d* to channel 602, 604 that can be reassigned to channel 606. The total power allotted to 602 and 604 during stage 612*d* is 0.43 picowatts, 0.215 picowatts each to 602 and 604. A new stage can be restarted by taking away the stage 612*d* 0.43 picowatts of power from 602 and 604 and immediately assign 0.35 picowatts of this power to 606. This process is depicted by arrow "5a" and label 612*e*. At the end of stage 612*e*, 0.35 picowatts has been assigned to channel 606, 0.32 picowatts to 604, and 0.5 picowatts to 602, totaling 1.17 picowatts. It will be appreciated that computing the optimal solution for power allocation requires solving a system of cubic equations. Practical implementations such as one based upon the description presented here will involve design choices that will result in slight differences from the optimal solution. For example, in this case, the gap between what is shown in the figure as being expended in stage 612*d* (0.43 pw) and what is needed to bring about the abrupt change in line 606 (0.35 pw) represents a design choice that was found to result in the implementation MUDdy water-filling result to be closer to the optimal MUDdy water-filling result for many example cases. During stage 612*f*, shown by arrows labeled "5b," conventional water-filling may recommence with all three channels 602, 604, 606 available. Accordingly, nothing is lost relative to the virtual gains made with channels 602, 604, and the benefit of having reassigned stage 612*d*'s power to channel 606 can be realized.

Referring to FIG. 7, a method 700 corresponds to one possible implementation of the MUDdy water-filling power allocation technique. The method 700 allocates a fraction of the total available SUOC to one or more target FUOC channels. The method 700 partitions the target FUOC channels into three groups: inactive candidates channels, standby channels, and active candidate channels. Power is allocated only to active candidate channels, however channels can be promoted from inactive to standby to active. In method 700, once promoted, a channel is never demoted. Initially, all target channels are considered inactive candidates. In some embodiments, the method 700 maintains a list of active candidate channels and standby channels; channels not in this lists are considered to be inactive candidates.

The method 700 describes one instantiation of a procedure to determine the MUDdy water-filling power assignment for any number of FUOC channels under consideration for coplacement of a SUOC's fractionated signal. The method 700 may be performed within the processing unit of the SUOC transmitter or in the SUOC receiver. If performed in the SUOC receiver, the SUOC receiver would then send a control message to the SUOC transmitter to inform it of the power assignment to be used. Method 700 uses the adaptation tables or mappings assumed to represent those being used by the FUOC nodes to instruct them to adjust rates when they experience interference or increased noise levels. Method 700 is not an interactive procedure played out in the actual environment, although one instantiation could be to implement it as such. The preferred method for implementation of the MUDdy water-filling algorithm, however, is for all actions of the SUOC incremental power placement and all reactions from the FUOC to be performed in the virtual sense within the processing unit of the SUOC using equation (3) and the models for FUOC adaptation processes as needed.

The method 700 proceeds in a stepwise fashion, wherein an increment of power is allocated to one of the active candidate channels in each iteration/step. In addition, the method 700 maintains a so-called "counter," which is used to determine when an inactive candidate channel should be considered for promotion. In various embodiments, the counter is a decrementing counter, although any other suitable mechanism can be used.

During the MUDdy water-filling method 700, total power may be tracked for each channel and lookup tables mapping available power to allocated power per channel can be constructed.

At block 702, an ENP value is initialized for each target FUOC channel. This may include using equation (3) above to determine $N_i^{(eq)}$ for each channel i, wherein the fraction of power allocated to each channel is initially zero (i.e., $k_i$=0).

At block 704, the counter is initialized by setting it to zero.

At block 705, the inactive candidate channel with the lowest minimum equivalent noise power (MENP) is promoted to being a standby candidate. For the case of there being more than one channel with the same MENP, all channels with the same lowest MENP are promoted to the standby channel list. As used herein, "minimum equivalent noise power" for a channel refers to the value of ENP for that channel minimized over all possible powers greater than what has already been allocated to that channel. This concept can be understood using the allocated power vs. equivalent noise power graph 600 of FIG. 6: the MENP for a channel is the minimum ENP for the channel's corresponding plot line to the right of the current power that has been allocated to that channel. During execution of the method 700, a lookup table may be maintained that tracks total allocated power, current allocated power to each channel, and the MENP for each channel.

At block 706, all existing standby candidate channels are promoted to active candidate channels.

At block 708, power is allocated to the active candidate channel with the lowest MENP. This may involve: (1) selecting MENP values for each active candidate channel from a lookup table; (2) comparing the selected MENP values to find a minimum; and (3) choosing the channel having the minimum MENP or if multiple channels having the same minimum value of MENP, choose any one of them. In various embodiments, a fixed amount of power (referred to herein as an "increment size" and denoted increment_size) is allocated per iteration. The increment size may be any suitable value, such as a value that is one tenth the power of the lowest power user.

At block 710, if all available power $P_{K+1}$ has been allocated, the power allocation method 700 may terminate.

At block 712, a determination is made whether the counter is negative. If the counter is not negative, it may be decremented (block 714) and the next iteration may begin at block 708. In various embodiments, the counter is decremented by 1. Otherwise, if the counter is negative, processing may proceed at block 715.

At block 715, a determination is made as to whether there are any standby candidates. If there are standby candidates, the next iteration begins at block 706. Otherwise, processing proceeds to block 716.

At block 716, a determination is made whether there is an inactive candidate channel with a lower MENP compared to the channels currently on the active candidate channel list. If such an inactive candidate channel exists, processing continues at block 718. Otherwise, the next iteration may begin at block 708.

At block 718, the inactive candidate channel with the lowest MENP is promoted to standby candidate status and the counter is set based upon the inactive candidate channel with the lowest MENP (i.e., the channel identified at block 716). In certain embodiments, the counter is set equal to $\lfloor (P_{MENP})/\text{increment\_size} \rfloor$, where the fraction is rounded down to the nearest integer and $P_{MENP}$ is the allocated power value yielding the MENP for the candidate channel that was just promoted to the standby list. Accordingly, when the counter is decremented by 1 at subsequent iterations, the counter becomes negative when a standby candidate channel may become a desirable candidate for power allocation if power had been allocated to that channel instead of channels with lower ENP. This scenario is described above with channel 606 in FIG. 6 and shown by an abrupt downward step in the plot 600.

Once block 718 completes, the next iteration begins at block 708.

Figure 8:
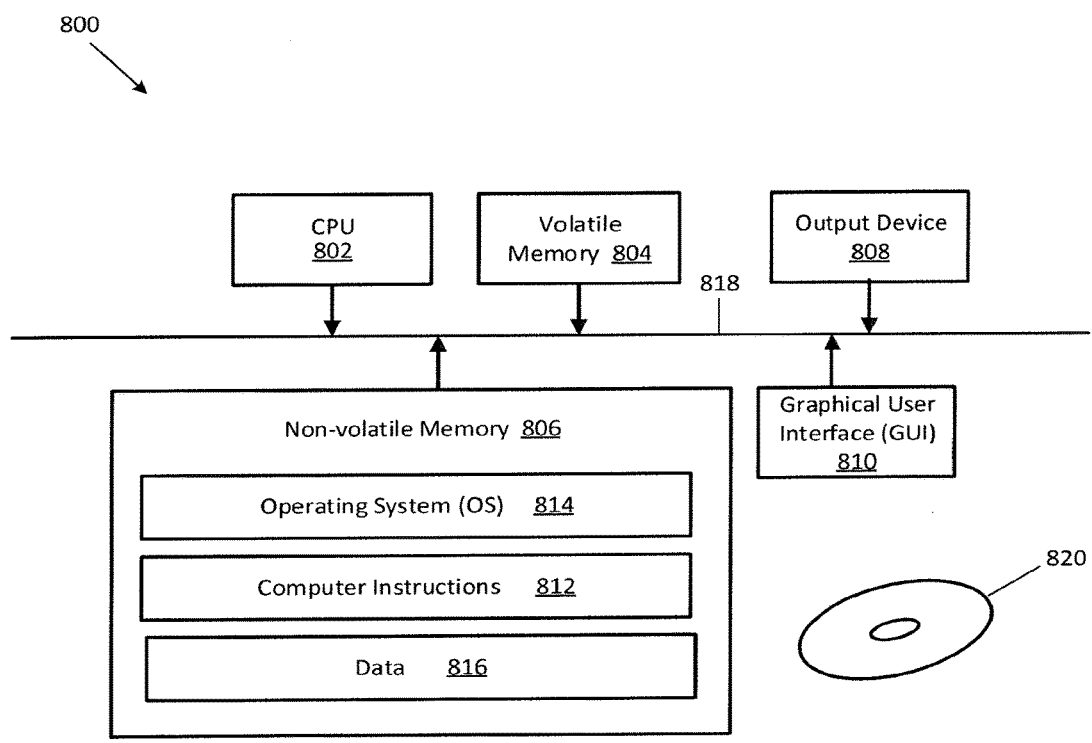
FIG. 8 is a schematic representation of an illustrative computer for use with the system of FIG. 2.

FIG. 8 shows an illustrative computer or other processing device 800 that can perform at least part of the processing described herein. In some embodiments, the cognitive transmit-receive system 200 of FIG. 2 includes the computer 800, or otherwise forms a portion of the computer 800. The computer 800 includes a processor 802, a volatile memory 804, a non-volatile memory 806 (e.g., hard disk), an output device 808 and a graphical user interface (GUI) 810 (e.g., a mouse, a keyboard, a display, for example), each of which is coupled together by a bus 818. The non-volatile memory 806 stores computer instructions 812, an operating system 814, and data 816. In one example, the computer instructions 812 are executed by the processor 802 out of volatile memory 804. In one embodiment, an article 820 comprises non-transitory computer-readable instructions.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

The invention claimed is:

1. In a radio network having a plurality of first users on channel (FUOCs) and one or more second users on channel (SUOCs), a method comprising:
   (a) identifying a plurality of target FUOCs, each of the target FUOCs operating in respective target FUOC channel;
   (b) for each target FUOC channel, determining a corresponding FUOC signal power and a corresponding noise power as seen by a SUOC receive node;
   (c) for each target FUOC channel, determining a corresponding FUOC signal power and a corresponding noise power as seen by a FUOC receive node;
   (d) allocating a total available SUOC power across two or more of the target FUOC channels as assigned FUOC channels based upon the FUOC signal powers and noise powers determined at steps (b) and (c);
   (e) splitting a SUOC transmit signal into a plurality of streams, each stream associated with one assigned FUOC channels; and
   (f) transmitting each stream within the associated assigned FUOC channel using the fraction of the total available SUOC power allocated to the assigned FUOC channel.

2. The method of claim 1 wherein steps (a)c) are performed at first SUOC node and steps (d)f) are performed at a second SUOC node, the method further comprising transmitting FUOC signal powers and noise powers from the first SUOC node to the second SUOC node.

3. The method of claim 1 wherein determining a corresponding FUOC signal power and a noise power as seen by a SUOC receive node comprises at least one of:
   broadcasting from a first SUOC node, received powers in each FUOC channel to at least a second SUOC node;
   estimating the received power at a SUOC node for each band; and
   transmitting a pulse tone from a first SUOC node to a second SUOC node and measuring the response.

4. The method of claim 1 wherein determining a corresponding FUOC signal power and a noise power as seen by a FUOC receive node comprises estimating the corresponding FUOC signal power and noise power using information about the FUOC operates.

5. The method of claim 1 wherein allocating a total available SUOC power across two or more of the target FUOC channels as assigned FUOC channels comprises using a water-filling technique.

6. The method of claim 5 wherein using a water-filling technique comprises:
   determining an initial equivalent noise power (ENP) for each target FUOC channel;
   iteratively allocating an increment of the total available SUOC power to ones of the target FUOC channels, wherein at each iteration power is allocated to a FUOC channel having a lowest minimum equivalent noise power (MENP) at each increment; and
   determining if one of the target FUOC channels onto which power has not been allocated has a lower MENP compared to target FUOC channels onto which power has been allocated.

7. The method of claim 6 further comprising constructing lookup tables mapping available power to allocated power per channel.

8. The method of claim 6 wherein determining an initial ENP for each target FUOC channel comprises:
   computing a ratio of the corresponding FUOC signal power as seen by a FUOC receive node and the corresponding FUOC signal power as seen by a SUOC receive node; and
   computing a ratio of the corresponding noise power as seen by a FUOC receive node and the corresponding noise power as seen by a SUOC receive node.

9. The method of claim 1 wherein transmitting each of the plurality of streams within a respective one of the plurality of FUOC channels comprises:
   for each of the plurality of FUOCs, determining one or more FUOC waveform signal parameters associated with the FUOC;
   for each of the plurality of FUOCs, choosing an interfering waveform based upon the associated FUOC waveform signal parameters;
   modulating each of the plurality of streams using a respective interfering waveform; and
   transmitting the modulated streams.

10. The method of claim 9, wherein choosing an interfering waveform comprises at least one of:

choosing an interfering waveform that mimics an existing FUOC signal;

choosing an interfering waveform well-matched to an existing FUOC signal; and choosing an interfering waveform having a shape related to an existing FUOC signal waveform by a non-dispersive transform such that the shaped waveform remains within the channel for the existing FUOC link.

11. The method of claim 1 further comprising:

receiving the plurality of streams at a multiuser detection (MUD) receiver; and decoding and combining the received streams to recover a SUOC transmit signal.

12. The method of claim 11 wherein the MUD receiver decodes a plurality of signals using parallel MUDs.

* * * * *